US012730926B2

(12) United States Patent
Zawisza

(10) Patent No.: US 12,730,926 B2
(45) Date of Patent: Sep. 8, 2026

(54) SENSITIVE DATA PROTECTION

(71) Applicants: ATLASSIAN PTY LTD., Sydney (AU); ATLASSIAN US, INC., San Francisco, CA (US)

(72) Inventor: Brian Zawisza, Woodbridge, NJ (US)

(73) Assignees: Atlassian Pty, Ltd., Sydney (AU); Atlassian US, Inc., San Francisco, CA (US)

(*) Notice: Subject to any disclaimer, the term of this patent is extended or adjusted under 35 U.S.C. 154(b) by 219 days.

(21) Appl. No.: 18/192,113

(22) Filed: Mar. 29, 2023

(65) Prior Publication Data

US 2024/0330502 A1 Oct. 3, 2024

(51) Int. Cl.
*G06F 21/62* (2013.01)
*G06F 21/52* (2013.01)

(52) U.S. Cl.
CPC .......... *G06F 21/6245* (2013.01); *G06F 21/52* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 11,729,149 | B2 * | 8/2023 | Mooney | H04L 9/0891 726/26 |
| 2013/0104239 | A1 * | 4/2013 | McLachlan | G06F 7/588 726/26 |
| 2019/0190890 | A1 * | 6/2019 | Druker | G06F 21/6254 |
| 2021/0216435 | A1 * | 7/2021 | Godefroid | G06F 11/3676 |
| 2023/0229790 | A1 * | 7/2023 | Mozer | G06F 21/53 726/26 |
| 2024/0078337 | A1 * | 3/2024 | Kamyshenko | G06F 21/6245 |
| 2024/0330502 | A1 * | 10/2024 | Zawisza | G06F 21/52 |

* cited by examiner

*Primary Examiner* — Atta Khan
(74) *Attorney, Agent, or Firm* — Alston & Bird LLP

(57) ABSTRACT

Embodiments provide a sensitive data protection system for protecting sensitive data by augmenting one or more computer program portions to secure sensitive data associated with the one or more computer program portions. Embodiments include parsing one or more computer program code portions to identify one or more sensitive data portions, where the one or more sensitive data portions are associated with one or more respective sensitive data categories. Embodiments also include transforming the one or more computer program code portions into one or more respective secured data types such that the one or more sensitive data portions associated with the one or more respective secured data types are secured against unauthorized access by one or more third-party computer applications, web applications, services, end users, enterprises, and/or other third-party entities.

20 Claims, 6 Drawing Sheets

```
export interface Board extends Properties {
   name: UGCString;
   lists: mongoose.Types.DocumentArray<List >
   desc: string;
   descData: object;
   invitationTokens: string[];
```

402

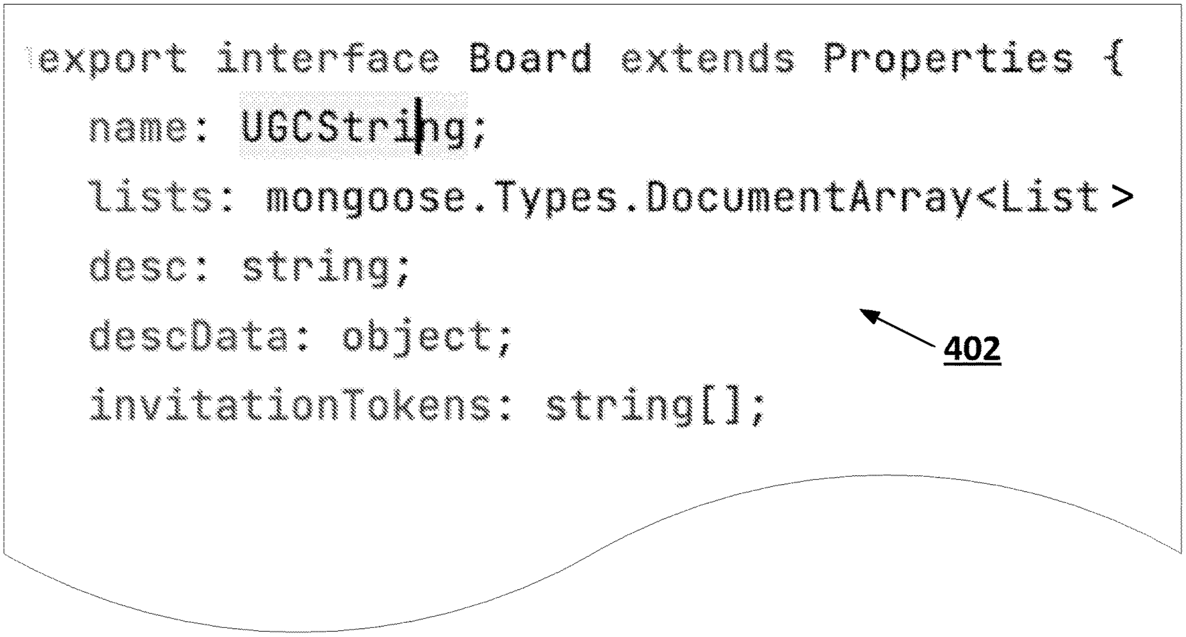

FIG. 4A

TS2322: Type 'UGCString' is not assignable to type 'string'.

Make 'getValue' return 'UGCString' ⌥⇧↵ More actions... ⌥↵

Board.name: UGCString app/schema/board.ts

406

```
...
let model = new Board();
...
{ ...

    log(model.name)

    },
}...
```

404

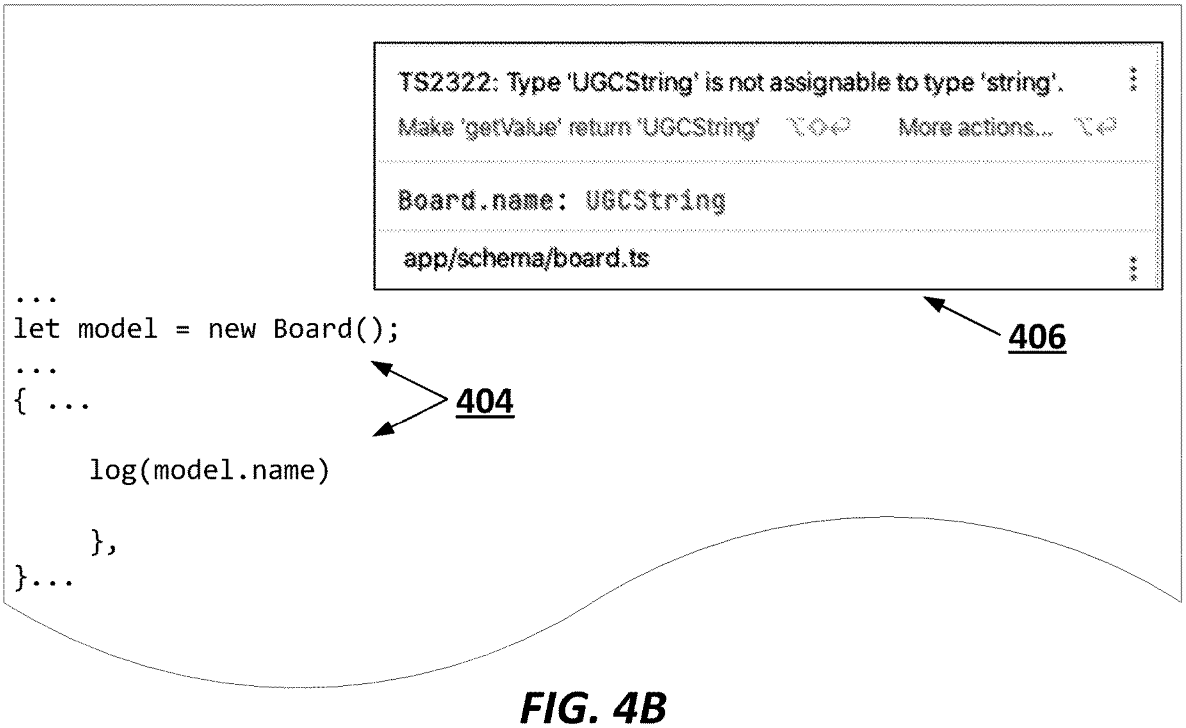

PARSE ONE OR MORE COMPUTER PROGRAM CODE PORTIONS TO IDENTIFY ONE OR MORE SENSITIVE DATA PORTIONS, WHERE THE ONE OR MORE SENSITIVE DATA PORTIONS ARE ASSOCIATED WITH ONE OR MORE RESPECTIVE SENSITIVE DATA CATEGORIES
502

TRANSFORM THE ONE OR MORE COMPUTER PROGRAM CODE PORTIONS INTO ONE OR MORE RESPECTIVE SECURED DATA TYPES SUCH THAT THE ONE OR MORE SENSITIVE DATA PORTIONS ASSOCIATED WITH THE ONE OR MORE RESPECTIVE SECURED DATA TYPES ARE SECURED AGAINST UNAUTHORIZED ACCESS BY ONE OR MORE COMPUTER APPLICATIONS
504

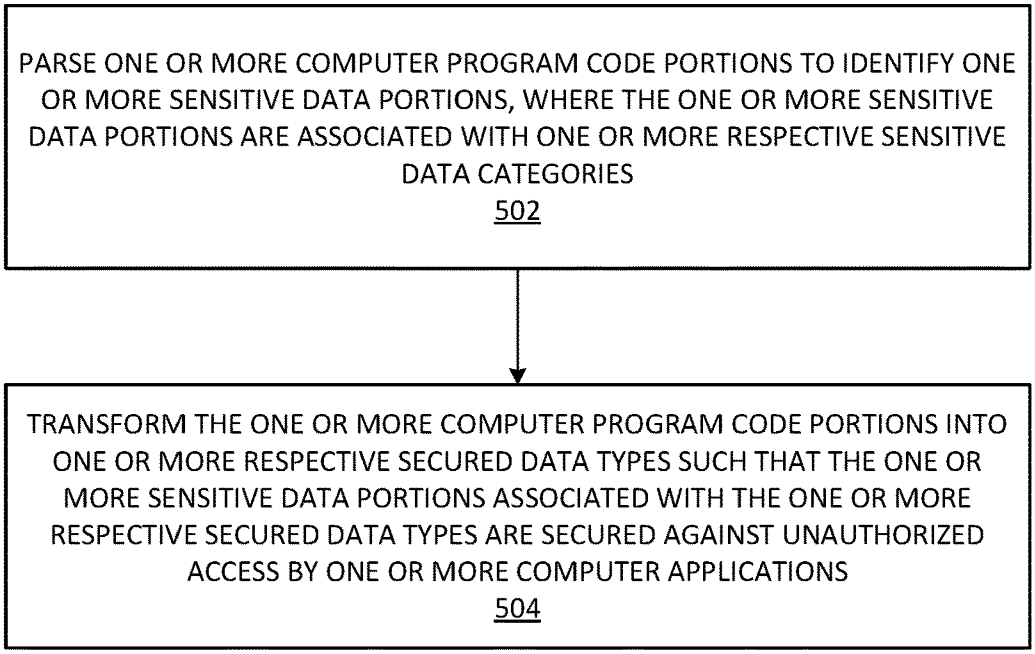

RANK, BASED ON A PREDICTED DATA SENSITIVITY SCORE, EACH OF THE ONE OR MORE COMPUTER PROGRAM CODE PORTIONS THAT WERE CAST INTO THE INTERMEDIARY ALIAS DATA TYPE
602

DETERMINE BASED THE RESPECTIVE PREDICTED DATA SENSITIVITY SCORES, WHETHER THE ONE OR MORE COMPUTER PROGRAM CODE PORTIONS THAT WERE CAST INTO THE INTERMEDIARY ALIAS DATA TYPE SATISFY A PREDICTED DATA SENSITIVITY SCORE THRESHOLD
604

IN RESPONSE TO DETERMINING THAT THE ONE OR MORE COMPUTER PROGRAM CODE PORTIONS SATISFY THE PREDICTED DATA SENSITIVITY SCORE THRESHOLD, TRANSFORM THE ONE OR MORE COMPUTER PROGRAM CODE PORTIONS INTO THE ONE OR MORE RESPECTIVE SECURED DATA TYPES
606

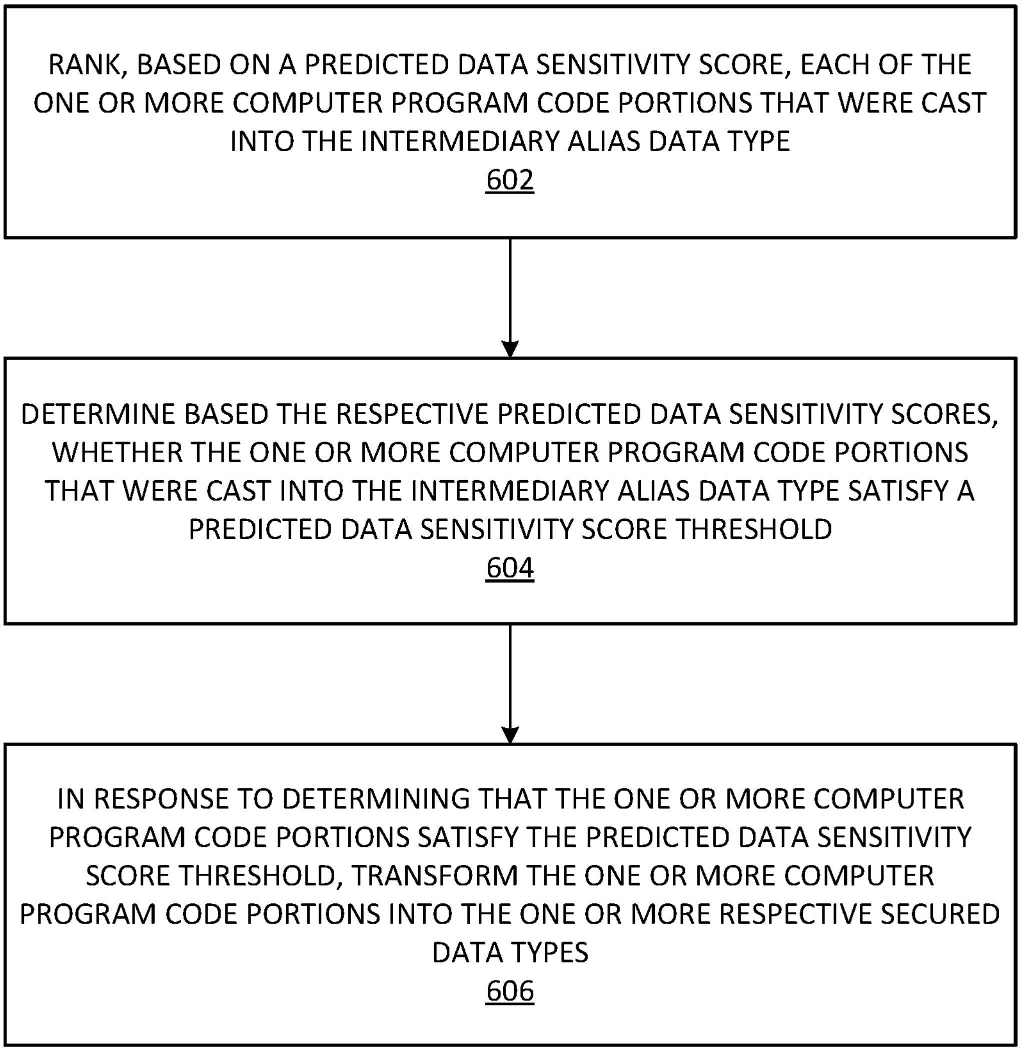

*FIG. 6*

SENSITIVE DATA PROTECTION

TECHNICAL FIELD

Embodiments of the present disclosure are generally directed protecting sensitive data, and specifically to dynamically augmenting one or more portions of computer program code to secure sensitive data portions associated with the one or more portions of computer program code against unauthorized access.

BACKGROUND

Software development enterprises and other users often employ web-based collaborative working platforms for enabling the efficient collaboration of multiple end users associated with respective user profiles. Such web-based collaborative working platforms may integrate with third-party applications, services, and/or programming libraries that should not be provided access to sensitive data associated with the respective software development enterprises and/or the respective user profiles. Applicant has discovered various technical problems associated with conventional methods for protecting sensitive data. Through applied effort, ingenuity, and innovation, Applicant has solved many of these identified problems by developing the embodiments of the present disclosure, which are described in detail below.

BRIEF SUMMARY

In one aspect, a computer-implemented method for protecting sensitive data is provided. The computer-implemented method includes parsing one or more computer program code portions to identify one or more sensitive data portions, where the one or more sensitive data portions are associated with one or more respective sensitive data categories. The computer-implemented method also includes transforming the one or more computer program code portions into one or more respective secured data types such that the one or more sensitive data portions associated with the one or more respective secured data types are secured against unauthorized access by one or more computer applications.

The computer-implemented method further includes where parsing the one or more computer program code portions to identify one or more sensitive data portions comprises casting the one or more computer program code portions associated with the one or more sensitive data portions into an intermediary alias data type.

The computer-implemented method further includes where transforming the one or more computer program code portions into the one or more respective secured data types comprises ranking, based on a predicted data sensitivity score, each of the one or more computer program code portions that were cast into the intermediary alias data type. The computer-implemented method also includes determining, based the respective predicted data sensitivity scores, whether the one or more computer program code portions that were cast into the intermediary alias data type satisfy a predicted data sensitivity score threshold. The computer-implemented method also includes, in response to determining that the one or more computer program code portions satisfy the predicted data sensitivity score threshold, transforming, the one or more computer program code portions into the one or more respective secured data types.

The computer-implemented method further includes where the one or more sensitive data portions are used in one or more computer program functions that perform at least one of outputting data related to the one or more sensitive data portions, logging data related to the one or more sensitive data portions, mutating data related to the one or more sensitive data portions, or compiling metrics associated with the one or more sensitive data portions.

The computer-implemented method further includes where the one or more respective sensitive data categories comprise at least one of user generated content (UGC), personally identifiable information (PII), application usage related data, security related data, enterprise related data, or commerce related data.

The computer-implemented method further includes where the one or more respective secured data types are associated with at least one of one or more respective primitive data types or array types.

The computer-implemented method further includes executing one or more redaction functions, where executing the one or more redaction functions causes the one or more sensitive data portions associated with the one or more respective secured data types to become accessible by the one or more computer applications.

The computer-implemented method further includes where the one or more secured data types are configured to make the one or more respective sensitive data portions inaccessible to one or more programming functions associated with one or more programming libraries.

In another aspect, an apparatus for protecting sensitive data includes at least one processor. The apparatus also includes at least one memory storing instructions that, when executed by the at least one processor, cause the apparatus to parse one or more computer program code portions to identify one or more sensitive data portions, where the one or more sensitive data portions are associated with one or more respective sensitive data categories. The apparatus also includes instructions that, when executed by the at least one processor, transform the one or more computer program code portions into one or more respective secured data types such that the one or more sensitive data portions associated with the one or more respective secured data types are secured against unauthorized access by one or more computer applications.

The apparatus further includes where the instructions to parse the one or more computer program code portions to identify one or more sensitive data portions comprise instructions that cause the apparatus to cast the one or more computer program code portions associated with the one or more sensitive data portions into an intermediary alias data type.

The apparatus further includes where the instructions to transform the one or more computer program code portions into the one or more respective secured data types further comprise instructions that cause the apparatus to rank, based on a predicted data sensitivity score, each of the one or more computer program code portions that were cast into the intermediary alias data type. The apparatus also includes instructions to determine, based the respective predicted data sensitivity scores, whether the one or more computer program code portions that were cast into the intermediary alias data type satisfy a predicted data sensitivity score threshold. The apparatus also includes instructions to, in response to determining that the one or more computer program code portions satisfy the predicted data sensitivity score threshold, transform, the one or more computer program code portions into the one or more respective secured data types.

The apparatus further includes where the one or more sensitive data portions are used in one or more computer program functions that perform at least one of outputting data related to the one or more sensitive data portions, logging data related to the one or more sensitive data portions, mutating data related to the one or more sensitive data portions, or compiling metrics associated with the one or more sensitive data portions.

The apparatus further includes where the one or more respective sensitive data categories comprise at least one of user generated content (UGC), personally identifiable information (PII), application usage related data, security related data, enterprise related data, or commerce related data.

The apparatus further includes where the one or more respective secured data types are associated with at least one of one or more respective primitive data types or array types.

The apparatus further includes instructions to execute one or more redaction functions, where executing the one or more redaction functions causes the one or more sensitive data portions associated with the one or more respective secured data types to become accessible by the one or more computer applications.

The apparatus further includes where the one or more secured data types are configured to make the one or more respective sensitive data portions inaccessible to one or more programming functions associated with one or more programming libraries.

In yet another aspect, a non-transitory computer-readable storage medium for protecting sensitive data is provided. The non-transitory computer-readable storage medium includes instructions that, when executed by at least one processor, cause the at least one processor to parse one or more computer program code portions to identify one or more sensitive data portions, where the one or more sensitive data portions are associated with one or more respective sensitive data categories. The non-transitory computer-readable storage medium also includes instructions that, when executed by the at least one processor, transform the one or more computer program code portions into one or more respective secured data types such that the one or more sensitive data portions associated with the one or more respective secured data types are secured against unauthorized access by one or more computer applications.

The non-transitory computer-readable storage medium further includes where the instructions to parse the one or more computer program code portions to identify one or more sensitive data portions comprise instructions that cause the apparatus to cast the one or more computer program code portions associated with the one or more sensitive data portions into an intermediary alias data type.

The non-transitory computer-readable storage medium further includes where the instructions to transform the one or more computer program code portions into the one or more respective secured data types further comprise instructions that cause the apparatus to rank, based on a predicted data sensitivity score, each of the one or more computer program code portions that were cast into the intermediary alias data type. The non-transitory computer-readable storage medium also includes instructions to determine, based the respective predicted data sensitivity scores, whether the one or more computer program code portions that were cast into the intermediary alias data type satisfy a predicted data sensitivity score threshold. The non-transitory computer-readable storage medium also includes instructions to, in response to determining that the one or more computer program code portions satisfy the predicted data sensitivity score threshold, transform, the one or more computer program code portions into the one or more respective secured data types.

The non-transitory computer-readable storage medium further includes where the one or more sensitive data portions are used in one or more computer program functions that perform at least one of outputting data related to the one or more sensitive data portions, logging data related to the one or more sensitive data portions, mutating data related to the one or more sensitive data portions, or compiling metrics associated with the one or more sensitive data portions.

The non-transitory computer-readable storage medium further includes where the one or more respective sensitive data categories comprise at least one of user generated content (UGC), personally identifiable information (PII), application usage related data, security related data, enterprise related data, or commerce related data.

The non-transitory computer-readable storage medium further includes where the one or more respective secured data types are associated with at least one of one or more respective primitive data types or array types.

The non-transitory computer-readable storage medium further includes instructions to execute one or more redaction functions, where executing the one or more redaction functions causes the one or more sensitive data portions associated with the one or more respective secured data types to become accessible by the one or more computer applications.

The non-transitory computer-readable storage medium further includes where the one or more secured data types are configured to make the one or more respective sensitive data portions inaccessible to one or more programming functions associated with one or more programming libraries.

BRIEF DESCRIPTION OF THE SEVERAL VIEWS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. To easily identify the discussion of any particular element or act, the most significant digit or digits in a reference number refer to the figure number in which that element is first introduced.

FIGS. 4A-B illustrate an exemplary application of a custom linting rule set configured for an integrated development environment (IDE) in accordance with one or more embodiments of the present disclosure.

FIG. 5 illustrates a flowchart representing a process for dynamically protecting sensitive data by transforming computer program portions into respective secured data types in accordance with one or more embodiments of the present disclosure.

FIG. 6 illustrates a flowchart representing a process for computing predicted data sensitivity scores in accordance with one or more embodiments of the present disclosure.

DETAILED DESCRIPTION

Figure 1:
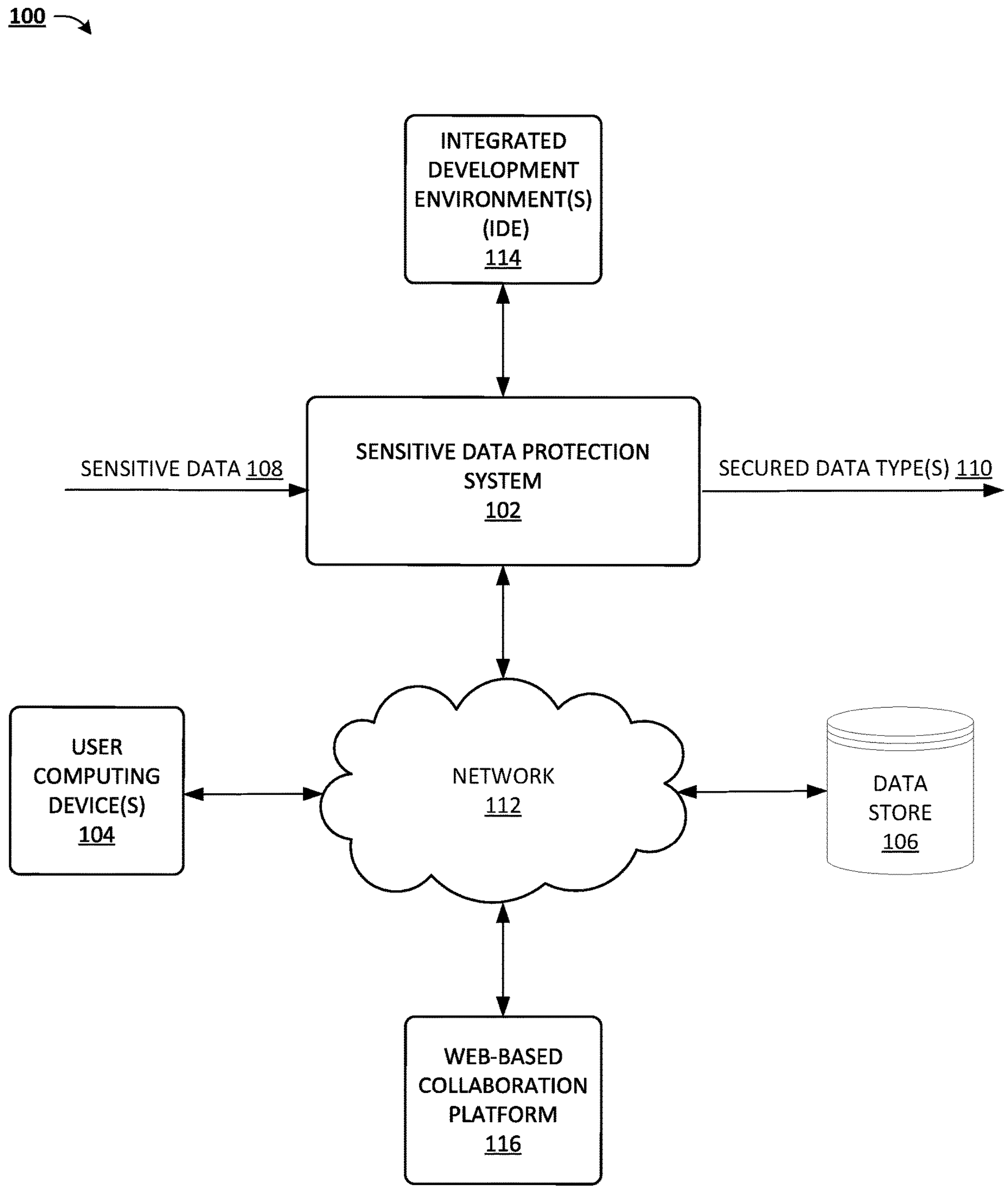
FIG. 1 is a diagram of an exemplary sensitive data protection system architecture configured for protecting sensitive data in accordance with one or more embodiments of the present disclosure.

Various embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. The terms "illustrative," "example," and "exemplary" are used to be examples with no indication of quality level. Like numbers refer to like elements throughout.

Overview

Web-based collaboration platforms are useful for agile project management teams, software developers, and other enterprise users for managing projects and tasks as well as resolving alerts, errors, incidents, or problems during the development, delivery, execution, debugging, incident identification, troubleshooting, and/or operation of software. However, the web-based nature of such collaboration platforms exposes an enterprise, the employees of the enterprise, and/or the customers of the enterprise to various risks involving the management of sensitive data. For example, a web-based collaboration platform may integrate with, or embody, one or more third-party computer applications, third-party web applications, third-party services, third-party end users, third-party enterprises, and/or other third-party entities. Such third-party entities should not be provided access to sensitive data related to the enterprise and/or the user profiles associated with the enterprise that are collaborating via the web-based collaboration platform.

Embodiments of the present disclosure provide for systems, apparatuses, computer-implemented methods, and computer program products that are configured for dynamically protecting one or more sensitive data portions associated with a particular enterprise that utilizes a web-based collaboration platform. Various embodiments are directed to a sensitive data protection system that is configured to, among other things, convert one or more sensitive data portions into one or more respective secured data types. As such, the secured data types can be employed by a web-based collaboration platform without risking unauthorized access to the sensitive data associated with the secure data types by one or more third-party entities. An example of a web-based collaboration platform that may use and/or be developed by using the sensitive data protection techniques disclosed herein is the Trello® web-based collaboration platform that is offered by Atlassian PTY LTD.

The sensitive data protection system is configured to perform one or more operations related to the analysis, protection, conversion, transformation, and/or classification of one or more data portions and, in particular, one or more sensitive data portions. Sensitive data can be understood as any portion of data (e.g., data attribute, data value, and/or metadata) that may be used to identify any piece of information an enterprise and/or an end user associated with a user profile related to the enterprise deems to be protected, classified, and/or otherwise private. Many sensitive data types will be described herein, but a few non-limiting examples of sensitive data include password data, personal identification data, financial data, user profile data, enterprise data (e.g., private business data), and/or the like.

The sensitive data protection system can classify, categorize, and/or otherwise label one or more sensitive data portions according to a particular sensitive data category. Non-limiting examples of sensitive data categories include user generated content (UGC), personally identifiable information (PII), application usage data, security data, enterprise data, and/or commerce data. The one or more sensitive data portions associated with the one or more respective sensitive data categories can be stored in a data store (e.g., a cloud-based storage system) associated with an enterprise and/or a web-based collaboration platform.

The sensitive data protection system is configured to generate one or more secured data types associated with one or more respective sensitive data portions. Secured data types are types of data, data objects, computer program code portions, and/or the like that have been secured against unauthorized access by one or more third-party computer applications, third-party services, third-party end users, third-party enterprises, and/or any other entity that should not have access to the one or more sensitive data portions associated with a respective secured data type. One or more secured data types can be associated with at least one respective primitive data type and/or array type. Furthermore, secured data types are configured to make the one or more respective sensitive data portions associated with the secured data type inaccessible to one or more programming functions associated with one or more programming libraries.

The sensitive data protection system can generate the one or more secured data types in various ways. For example, in various embodiments, the sensitive data protection system can transform one or more computer program portions into one or more respective secured data types by first parsing a computer programming code file that comprises the one or more computer program portions to identify one or more sensitive data portions. While parsing the computer programming code file, the sensitive data protection system can cast, mark, label, flag, and/or otherwise designate one or more computer program portions, electronically managed data, data object, and/or the like that comprise, point to, and/or are otherwise associated with the one or more sensitive data portions as an intermediary alias data type.

The sensitive data protection system is configured to cast, convert and/or otherwise transform one or more intermediary alias data types into one or more respective secured data types in order to protect the associated sensitive data portions from one or more third-party computer applications, third-party services, third-party end users, third-party enterprises, and/or any other entity that should not have access to the sensitive data portions. In order to transform the intermediary alias data types into one or more secured data types, the sensitive data protection system can perform various pre-processing operations. For example, in various embodiments, the sensitive data protection system can score, rank, classify, and/or otherwise assign a predicted data sensitivity score to a respective intermediary alias data type. The predicted data sensitivity score describes a level of sensitivity, importance, secrecy, significance and/or classification associated with the respective sensitive data portions associated with the intermediary alias data type.

Based on the predicted data sensitivity score, the sensitive data protection system can determine whether to convert the intermediary alias data type into a secured data type. For example, the sensitive data protection system can be configured to predetermine a predicted data sensitivity score threshold that an intermediary alias data type must satisfy (e.g., meet or exceed) in order to be transformed into a secured data type. If the sensitive data protection system determines that a particular computer program portion that has been cast into an intermediary alias data type is associated with a predicted data sensitivity score that satisfies (e.g., meets and/or exceeds) the predicted data sensitivity score threshold, the sensitive data protection system can decide to convert the particular computer program portion that has been cast into an intermediary alias data type into a secured data type.

Furthermore, as will be described in greater detail herein, the sensitive data protection system can be configured to facilitate the development of various software applications (e.g., a web-based collaboration platform) that may generate, manage, and/or otherwise interact with sensitive data. For example, the sensitive data protection system is configured to generate and/or execute a custom linting rule set for performing computer program code analysis to ensure the protection and safe usage of sensitive data. In this regard, the custom linting rule set can be generated by the sensitive data protection system and configured to integrate with one or more computer program code drafting applications (e.g., one or more integrated development environments (IDEs)). In various embodiments, the custom linting rule set can be configured to analyze and/or correct computer program code associated with sensitive data written in one or more respective computer programming languages such as, for example, JavaScript, Typescript, Python, Java, C++, C#, HTML, and/or the like.

Additionally, the sensitive data protection system is configured to generate and/or execute one or more redaction functions related to one or more computer program portions associated with one or more secured data types. Redaction functions are portions of executable code configured to convert, transform, modify, and/or otherwise augment a computer program code portion associated with a secured data type such that any sensitive data associated with the secured data type can be accessed and/or utilized by an authorized entity (e.g., an authorized user computing device and/or an authorized user profile).

As is evident by the methods, systems, apparatuses, and/or computer program products described herein, improvements to computer efficiency are made by reducing the time and resources necessary to generate and execute one or more sensitive data protection methods. Computational load and complexity are further reduced by avoiding unneeded operational steps and/or computer programming steps related to securing functions, methods, data objects, data constructs, data interfaces, and/or the like from misusing and/or misappropriating one or more sensitive data portions. Finally, the time, human resources, and cognitive load necessary to devise sensitive data protection procedures for one or more collaboration tools (e.g., a web-based collaboration platform) are also reduced.

Definitions

"Web-based collaboration platform" refers to a collaborative work platform directed towards enabling one or more user computing devices associated with one or more respective user profiles associated with a company, enterprise, and/or other organizational structure to work simultaneously on documents, projects, charts, Kanban-style boards, interactive lists, digital cards, and/or the like. A user computing device associated with a web-based collaboration platform can generate one or more interactive user interfaces associated with a particular collaborative project such that one or more client computing devices associated with one or more respective user profiles can simultaneously generate, update, and/or remove digital content associated with the collaborative project. As such, the same representation of digital content associated with a particular collaborative project is rendered on one or more respective interactive user interfaces associated with the one or more user computing devices, and any generation, update, and/or removal of the digital content is rendered in near real time on the one or more respective interactive user interfaces.

"Sensitive data protection system" refers to computer-coded instructions, executable code, a selected service of federated service architecture, and/or a software application that is configured for execution via one or more computing device(s). The computing device(s) and its associated components facilitate the management of sensitive data. The sensitive data protection system is configured to perform one or more operations related to the analysis, protection, conversion, transformation, and/or classification of one or more data portions and, in particular, one or more sensitive data portions. The sensitive data protection system is configured to generate one or more secured data types associated with one or more respective sensitive data portions. As such, the sensitive data protection system can be configured to facilitate the development of various software applications (e.g., a web-based collaboration platform) that may generate, manage, and/or otherwise interact with sensitive data. For example, the sensitive data protection system is configured to generate and/or execute a custom linting rule set for performing computer program code analysis to ensure the protection and safe usage of sensitive data. In various embodiments, a sensitive data protection system comprises or integrates with at least one data store and operates on one or more portions of executable code.

"Sensitive data" refers to any portion of data (e.g., data attribute, data value, and/or metadata) that may be used to identify any piece of information an enterprise and/or an end user associated with a user profile related to the enterprise deems to be protected, classified, and/or otherwise private. Non-limiting examples of sensitive data include data related to passwords, names, addresses, phone numbers, email addresses, user profile data, private image data, proprietary enterprise data, application programming interface (API) security keys and/or identifiers, customer data, project data, application data, application log data, IP address data, financial data, purchase data, inventory data, user comment data, user activity data, user input data, performance metrics, encryption data, hash data, API token data, authorization data, digital certification data, SSH data, and/or mobile device data. Sensitive data portions are portions of data that may be used in one or more computer program functions that perform at least one of outputting data related to the one or more sensitive data portions, logging data related to the one or more sensitive data portions, mutating data related to the one or more sensitive data portions, or compiling metrics associated with the one or more sensitive data portions. In various embodiments, sensitive data associated with a particular enterprise (e.g., a software development enterprise) and/or sensitive data related to one or more user profiles associated with the enterprise can be stored in a data store (e.g., a cloud-based storage system) associated with the enterprise.

"Sensitive data category" refers to a category, class, and/or subset of data to which a portion of sensitive data can be assigned, classified under, and/or otherwise associated with. Non-limiting examples of sensitive data categories include user generated content (UGC), personally identifiable information (PII), application usage data, security data, enterprise data, and/or commerce data. In various embodiments, sensitive data categories can be derived from one or more respective database schema labels. For example, in an embodiment in which one or more sensitive data portions associated with a particular enterprise are stored in a data store (e.g., a cloud-based storage system), the one or more sensitive data portions may be labeled according to a predefined database schema. As such, one or more labels defined by the database schema utilized by the data store can be used by the sensitive data protection system to generate the one or more sensitive data categories.

"Secured data type" refers to an electronically managed type of data, data object, computer program code portion, and/or the like that comprises, points to, and/or is otherwise associated with one or more sensitive data portions. Secured data types are types of data, data objects, computer program code portions, and/or the like that have been secured against unauthorized access by one or more third-party computer applications, third-party services, third-party end users, third-party enterprises, and/or any other entity that should not have access to the one or more sensitive data portions associated with a respective secured data type. One or more secured data types can be associated with at least one respective primitive data type and/or array type.

Furthermore, secured data types are configured to make the one or more respective sensitive data portions associated with the secured data type inaccessible to one or more programming functions associated with one or more programming libraries. Non-limiting examples of the one or more programming functions associated with the one or more programming libraries include programming functions that return a primitive data type associated with the secured data type, and/or programming functions that can output, log, transmit, print, mutate (e.g., concatenate, split, format, and/or append), cast, and/or otherwise employ the sensitive data associated with the secured data type. A non-limiting example of such a programming function is the ".toLowerCase( )" and/or the standard equivalent programming function that can format a portion of data (e.g., sensitive data) associated with a "String" data type by transforming any uppercase alphanumeric characters associated with the portion of data into a respective lowercase alphanumeric character. Non-limiting examples of secured data types configured in accordance with one or more embodiments of the present disclosure include UGCString, PIIString, and/or SecureString.

"Intermediary alias data type" refers to an electronically managed type of data, data object, computer program code portion, and/or the like associated with one or more sensitive data portions. Embodiments of the present disclosure can cast, mark, label, flag, and/or otherwise designate the electronically managed data, data object, computer program code portion, and/or the like as comprising, pointing to, and/or otherwise being associated with one or more sensitive data portions. Intermediary alias data types can be cast, converted and/or otherwise transformed into a respective secured data type in order to protect the associated sensitive data from one or more third-party computer applications, third-party services, third-party end users, third-party enterprises, and/or any other entity that should not have access to the one or more sensitive data portions.

"Predicted data sensitivity score" refers to a score, ranking, classification, and/or the like that can be assigned to a respective intermediary alias data type. The predicted data sensitivity score describes a level of sensitivity, importance, secrecy, significance and/or classification associated with the respective sensitive data portions associated with the intermediary alias data type. Based on the predicted data sensitivity score, the sensitive data protection system can determine whether to convert the intermediary alias data type into a secured data type.

"Predicted data sensitivity score threshold" refers to a threshold that can be predetermined by the sensitive data protection system in order to facilitate the decision to convert an intermediary alias data type into a secure data type. For example, if the sensitive data protection system determines that a particular computer program portion that has been cast into an intermediary alias data type is associated with a predicted data sensitivity score that satisfies (e.g., meets and/or exceeds) the predicted data sensitivity score threshold, the sensitive data protection system can decide to convert the particular computer program portion that has been cast into an intermediary alias data type into a secured data type.

"Redaction function" refers to one or more computer programming code portions (e.g., executable code portions) configured to convert, transform, modify, and/or otherwise augment a computer program code portion associated with a secured data type such that any sensitive data associated with the secured data type can be accessed and/or utilized by an authorized entity (e.g., an authorized user computing device and/or an authorized user profile).

"Custom linting rule set" refers to a set of rules, computer program code portions, and/or executable code configured for performing computer program code analysis to ensure the protection and safe usage of sensitive data. One or more custom linting rule sets can be generated by the sensitive data protection system and configured to integrate with one or more computer program code drafting applications (e.g., one or more integrated development environments (IDEs)). The one or more custom linting rule sets can be configured to flag and/or correct one or more predefined computer program code errors, one or more unsecure computer program code constructs (e.g., unsecure data objects comprising sensitive data portions), one or more computer programming bugs, one or more stylistic errors associated with one or more portions of computer program code, and/or one or more syntax errors associated with one or more portions of computer program code. In various embodiments, the one or more custom linting rule sets can be configured to analyze and/or correct computer program code associated with sensitive data written in one or more respective computer programming languages such as, for example, JavaScript, Typescript, Python, Java, C++, C#, HTML, and/or the like.

"Computing device" refers to any computer, processor, circuitry, and/or other executor of computer instructions that is embodied in hardware, software, firmware, and/or any combination thereof. Non-limiting examples of a computing device include a computer, a processor, an application-specific integrated circuit, a field-programmable gate array, a personal computer, a smart phone, a laptop, a fixed terminal, a server, a networking device, and a virtual machine.

"User computing device" refers to a computing device associated with a person, company, or other organizational structure that controls one or more systems. In some embodiments, a user computing device is associated with particular administrative credentials that define access to operation via a particular system.

"Executable code" refers to a portion of computer program code stored in one or a plurality of locations that is executed and/or executable via one or more computing devices embodied in hardware, software, firmware, and/or any combination thereof. Executable code defines at least one particular operation to be executed by one or more computing devices. In some embodiments, a memory, storage, and/or other computing device includes and/or otherwise is structured to define any amount of executable code (e.g., a portion of executable code associated with a first operation and a portion of executable code associated with a second operation). Alternatively or additionally, in some embodiments, executable code is embodied by separate computing devices (e.g., a first data store embodying first portion of executable code and a second data store embodying a second portion executable code).

"Data store" refers to any type of non-transitory computer-readable storage medium. Non-limiting examples of a data store include hardware, software, firmware, and/or a combination thereof capable of storing, recording, updating, retrieving and/or deleting computer-readable data and information.

"Data attribute" refers to electronically managed data representing a variable or particular criteria or property having a particular value or status. The value may be statically fixed or dynamically assigned. In some embodiments, a data attribute embodies a particular property of a data object.

"Data value" refers to electronically managed data representing a particular value for a particular data attribute.

"Metadata" refers to a collection of one or more data attributes associated with a data object such as a secured data type.

The phrases "in an embodiment." "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment). The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

As used herein, the terms "data," "content," "digital content," "data object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Example Systems, Apparatuses, and Data Flows of the Disclosure

FIG. 1 is a diagram of an exemplary sensitive data protection system architecture 100 configured for protecting sensitive data in accordance with one or more embodiments of the present disclosure. The exemplary sensitive data protection system architecture 100 comprises a sensitive data protection system 102, user computing device(s) 104, a data store 106, a network 112, an integrated development environment(s) (IDE(s)) 114, and/or a web-based collaboration platform 116. In various embodiments, the sensitive data protection system 102, the user computing device(s) 104, the data store 106, the IDE(s) 114, and/or the web-based collaboration platform 116 can communicate over one or more networks (e.g., the network 112).

The sensitive data protection system 102 refers to computer-coded instructions, executable code, a selected service of federated service architecture, and/or a software application that is configured for execution via one or more user computing device(s) 104. The sensitive data protection system 102 and its associated components facilitate the management of sensitive data. In various embodiments, the sensitive data protection system 102 can integrate with, or be embodied by, a user computing device 104. Additionally or alternatively, sensitive data protection system 102 is configured to integrate with one or more IDE(s) 114, one or more web-based collaboration platform(s) 116, and/or a data store 106. In various embodiments, the sensitive data protection system 102 can integrate with and/or communicate with one or more user computing device(s) 104, one or more IDE(s) 114, one or more web-based collaboration platform(s) 116, and/or a data store 106 via the network 112.

The sensitive data protection system 102 is configured to perform one or more operations related to the analysis, protection, conversion, transformation, and/or classification of one or more data portions and, in particular, one or more portions of sensitive data 108. Sensitive data 108 can be understood as any portion of data (e.g., data attribute, data value, and/or metadata) that may be used to identify any piece of information an enterprise and/or an end user associated with a user profile related to the enterprise deems to be protected, classified, and/or otherwise private.

Non-limiting examples of sensitive data 108 include data related to passwords, names, addresses, phone numbers, email addresses, user profile data, private image data, proprietary enterprise data, application programming interface (API) security keys and/or identifiers, customer data, project data, application data, application log data, IP address data, financial data, purchase data, inventory data, user comment data, user activity data, user input data, performance metrics, encryption data, hash data, API token data, authorization data, digital certification data, SSH data, and/or mobile device data. Sensitive data 108 can comprise portions of data that may be used in one or more computer program functions that perform at least one of outputting data related to the one or more portions of sensitive data 108, logging data related to the one or more portions of sensitive data 108, mutating data related to the one or more portions of sensitive data 108, or compiling metrics associated with the one or more portions of sensitive data 108. In various embodiments, sensitive data 108 associated with a particular enterprise (e.g., a software development enterprise) and/or sensitive data 108 related to one or more user profiles associated with the enterprise can be stored in a data store 106 (e.g., a cloud-based storage system) associated with the enterprise.

The sensitive data protection system 102 can classify, categorize, and/or otherwise label one or more portions of sensitive data 108 according to a particular sensitive data category. Non-limiting examples of sensitive data categories include user generated content (UGC), personally identifiable information (PII), application usage data, security data, enterprise data, and/or commerce data. The one or more portions of sensitive data 108 associated with the one or more respective sensitive data categories can be stored in the data store 106 associated with an enterprise and/or a web-based collaboration platform 116. In various embodiments, sensitive data categories can be derived from one or more respective database schema labels. For example, in an embodiment in which one or more portions of sensitive data 108 associated with a particular enterprise are stored in the data store 106 (e.g., a cloud-based storage system), the one or more portions of sensitive data 108 may be labeled according to a predefined database schema employed in the data store 106. As such, one or more labels defined by the database schema utilized by the data store 106 can be used by the sensitive data protection system 102 to generate the one or more sensitive data categories.

The sensitive data protection system 102 is configured to generate one or more secured data type(s) 110 associated with one or more respective portions of sensitive data 108. Secured data type(s) 110 are types of data, data objects, computer program code portions, and/or the like that have been secured against unauthorized access by one or more third-party computer applications, third-party services, third-party end users, third-party enterprises, and/or any other entity that should not have access to the one or more portions of sensitive data 108 associated with a respective secured data type 110. In various embodiments, one or more secured data type(s) 110 can be generated based in part on one or more respective sensitive data categories. Furthermore, one or more secured data type(s) 110 can be associated with at least one respective primitive data type and/or array type.

Furthermore, secured data type(s) 110 are configured to make the one or more respective portions of sensitive data 108 associated with the secured data type 110 inaccessible to one or more programming functions associated with one or more programming libraries used by one or more IDE(s) 114. Non-limiting examples of the one or more programming functions associated with the one or more programming libraries include programming functions that return a primitive data type (e.g., a String, Integer, Floating Decimal, and/or the like) associated with the secured data type 110, and/or programming functions that can output, log, transmit, print, mutate (e.g., concatenate, split, format, and/or append), cast, and/or otherwise employ the sensitive data 108 associated with the secured data type 110. A non-limiting example of such a programming function is the ".toLowerCase( )" and/or the standard equivalent programming function that can format a portion of data (e.g., sensitive data 108) associated with a String data type by transforming any uppercase alphanumeric characters associated with the portion of data into a respective lowercase alphanumeric character.

Non-limiting examples of secured data type(s) 110 configured in accordance with one or more embodiments of the present disclosure include a UGCString associated with sensitive data 108 comprising user generated content, a PIIString associated with sensitive data 108 comprising personally identifiable information, and/or a SecureString associated with sensitive data 108 comprising security-related authorization data. In various embodiments, secured data type(s) 110 are not interchangeable with one another. For example, if a secured data type 110*a* configured as a UGCString and a secured data type 110*b* configured as a PIIString are being utilized in a computer programming file (e.g., being drafted by an IDE 114), the secured data type(s) 110*a* and 110*b* are not interchangeable, combinable, and/or otherwise compatible for use in one or more computer programming functions and/or one or more portions of executable code. This is in contrast to a traditional data type such as, for example, the String data type used in various programming languages where two or more Strings may be interchanged, combined, concatenated, overwritten, and/or the like.

The sensitive data protection system 102 can generate the one or more secured data type(s) 110 in various ways. For example, in various embodiments, the sensitive data protection system 102 can transform one or more computer program portions into one or more respective secured data type(s) 110 by first parsing a computer programming code file that comprises the one or more computer program portions to identify one or more portions of sensitive data 108. While parsing the computer programming code file, the sensitive data protection system 102 can cast, mark, label, flag, and/or otherwise designate one or more computer program portions, electronically managed data, data object, and/or the like that comprise, point to, and/or are otherwise associated with one or more portions of sensitive data 108 as an intermediary alias data type.

In various embodiments, the sensitive data protection system 102 can embody, or integrate with, one or more artificial intelligence (AI) models trained to perform one or more AI techniques and/or one or more machine learning (ML) techniques for executing one or more of the methods described herein. The one or more AI models can be configured as an artificial neural network (ANN), a convolutional neural network (CNN), a recurrent neural network (RNN), or any other type of specially trained neural network that is configured to parse one or more portions of computer program code to determine whether the one or more portions of computer program code are associated with one or more portions of sensitive data 108.

The sensitive data protection system 102 is configured to cast, convert and/or otherwise transform one or more intermediary alias data types into one or more respective secured data type(s) 110 in order to protect the associated portions of sensitive data 108 from one or more third-party computer applications, third-party services, third-party end users, third-party enterprises, and/or any other entity that should not have access to the portions of sensitive data 108. In order to transform the intermediary alias data types into one or more secured data type(s) 110, the sensitive data protection system 102 can perform various pre-processing operations. For example, in various embodiments, the sensitive data protection system 102 can score, rank, classify, and/or otherwise assign a predicted data sensitivity score to a respective intermediary alias data type. The predicted data sensitivity score describes a level of sensitivity, importance, secrecy, significance and/or classification associated with the respective portions of sensitive data 108 associated with the intermediary alias data type.

Based on the predicted data sensitivity score, the sensitive data protection system 102 can determine whether to convert the intermediary alias data type into a secured data type 110. For example, the sensitive data protection system 102 can be configured to pre-determine a predicted data sensitivity score threshold that an intermediary alias data type must satisfy (e.g., meet or exceed) in order to be transformed into a secured data type 110. If the sensitive data protection system 102 determines that a particular computer program portion that has been cast into an intermediary alias data type is associated with a predicted data sensitivity score that satisfies (e.g., meets and/or exceeds) the predicted data sensitivity score threshold, the sensitive data protection system 102 can decide to convert the particular computer program portion that has been cast into an intermediary alias data type into a secured data type 110.

In various embodiments, one or more user computing device(s) 104 associated with one or more respective user profiles can, in conjunction with the sensitive data protection system 102, manually perform the aforementioned pre-processing operations related to scoring, ranking, classifying, and/or otherwise assigning a predicted data sensitivity score to a respective intermediary alias data type. Similarly, the one or more user computing device(s) 104 associated with the one or more respective user profiles can, in conjunction with the sensitive data protection system 102, manually define the predicted data sensitivity score threshold. For example, one or more user computing device(s) 104 associated with one or more respective user profiles related to a particular enterprise may determine that one or more respective intermediary alias data types associated with one or more respective types of sensitive data 108 rank higher (e.g., have a higher relative data sensitivity) than other respective intermediary alias data types. For example, the one or more user computing device(s) 104 associated with the one or more respective user profiles related to the particular enterprise can determine that an intermediary alias data type associated with security-related data should rank higher (e.g., be given priority over) than an intermediary alias data type associated with PII, which in turn should rank higher than an intermediary alias data type associated with UGC.

In some embodiments, the sensitive data protection system 102 can generate one or more portions of AI model training data based on one or more portions of computer program code that have been manually cast, marked, labeled, flagged, and/or otherwise designated as a respective intermediary alias data type associated with one or more portions of sensitive data 108 by one or more user computing device(s) 104 associated with one or more user profiles. In this regard, the one or more AI models can be trained based in part on the one or more portions of AI model training data generated by the sensitive data protection system 102 to determine which computer program portions associated with sensitive data 108 should be ultimately transformed into respective secured data type(s) 110. As such, the sensitive data protection system 102 can employ the one or more AI models to execute the aforementioned pre-processing operations related to scoring, ranking, classifying, and/or otherwise assigning a predicted data sensitivity score to a respective intermediary alias data type. Additionally, the one or more AI models can be employed to determine whether a predicted data sensitivity score associated with a respective intermediary alias data type satisfies the predetermined predicted data sensitivity score threshold.

The sensitive data protection system 102 can also be configured to facilitate the development of various software applications (e.g., a web-based collaboration platform 116) that may generate, manage, and/or otherwise interact with sensitive data 108. For example, the sensitive data protection system 102 is configured to generate and/or execute a custom linting rule set for performing computer program code analysis to ensure the protection and safe usage of sensitive data. In this regard, the custom linting rule set can be generated by the sensitive data protection system 102 and configured to integrate with one or more computer program code drafting applications (e.g., one or more IDE(s) 114). The one or more custom linting rule sets can be configured to flag and/or correct one or more predefined computer program code errors, one or more unsecure computer program code constructs (e.g., unsecure data objects comprising sensitive data 108), one or more computer programming bugs, one or more stylistic errors associated with one or more portions of computer program code, and/or one or more syntax errors associated with one or more portions of computer program code. In various embodiments, the custom linting rule set can be configured to analyze and/or correct computer program code associated with sensitive data 108 written in one or more respective computer programming languages such as, for example, JavaScript, Typescript, Python, Java, C++, C#, HTML, and/or the like.

Additionally, the sensitive data protection system 102 is configured to generate and/or execute one or more redaction functions related to one or more computer program portions associated with one or more secured data type(s) 110. Redaction functions are portions of executable code configured to convert, transform, modify, and/or otherwise augment a computer program code portion associated with a secured data type 110 such that any sensitive data 108 associated with the secured data type 110 can be accessed and/or utilized by an authorized entity (e.g., an authorized user computing device 104 and/or an authorized user profile).

The user computing device(s) 104 includes or is embodied by one or more user computing device(s), for example a smartphone, tablet, personal computer, laptop, and/or the like. The user computing device(s) 104 may be configured to store, access, or maintain one or more components of the sensitive data protection system 102, for example via one or more processor(s), non-transitory storage device(s), and/or communications circuitry(s) of the user computing device(s) 104. In some embodiments, the user computing device(s) 104 includes or is embodied in a single user computing device or plurality of interacting user computing devices. In other embodiments, the user computing device(s) 104 includes a plurality of user computing devices associated with a single user or a plurality of users, where a user can be a person, company, enterprise, or other organizational structure.

In one or more embodiments, the data store 106 can be any type of non-transitory computer-readable storage medium including, but not limited to, hardware, software, firmware, and/or a combination thereof capable of storing, recording, updating, retrieving and/or deleting computer-readable data and information. The data store 106 can integrate with, employ, and/or embody one or more data storage devices comprising memory for storing various types of data associated with the one or more components of the sensitive data protection system architecture 100. In one embodiment, the data storage devices integrated with and/or employed by the data store 106 are embodied in server-class hardware, such as enterprise-level servers. For example, in an embodiment, the data storage devices comprise any type or combination of application servers, communication servers, web servers, super-computing servers, database servers, file servers, mail servers, proxy servers, and/virtual servers. In various embodiments, the various data storage devices associated with the data store 106 can be configured, employed, and/or otherwise accessed via the network 112.

The network 112 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 112 may include a cellular telephone, an 802.11, 802.16, 802.20, and/or WiMax network. Further, the network 112 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a WebSocket channel. In some embodiments, the protocol is JSON over RPC, JSON over REST/HTTP, and/or the like.

The IDE(s) 114 can be any computer programming code drafting tool and/or application configured to generate, edit, compile, interpret, debug, and/or execute one or more portions of executable computer program code and/or one or more computer software applications. In various embodiments, the IDE(s) 114 can be web-based IDE(s) or standalone IDE(s) configured to generate, edit, compile, interpret, debug, and/or execute the one or more portions of executable computer program code and/or the one or more computer applications. In various embodiments, the sensitive data protection system 102 can integrate with, or be embodied by, the IDE(s) 114. For example, some of the functionalities provided by the sensitive data protection system 102 can be executed by, or executed in conjunction with, the IDE(s) 114. In various embodiments, the sensitive data protection system 102 can communicate with the IDE(s) 114 via the network 112. Non-limiting examples of an IDE 114 include Visual Studio, Visual Studio Code, NetBeans, PyCharm, WebStorm, CLion, IntelliJ IDEA, Eclipse, Xcode, Komodo, Zend Studio, Code::Blocks, Cloud Code, AWS Cloud9, CodePen, and/or the like.

The web-based collaboration platform 116 can be a cloud-based collaborative work platform directed towards enabling one or more user computing device(s) 104 associated with one or more respective user profiles associated with a company, enterprise, and/or other organizational structure to work simultaneously on documents, projects, charts, Kanban-style boards, interactive lists, digital cards, and/or the like. A user computing device 104 associated with a web-based collaboration platform 116 can generate one or more interactive user interfaces associated with a particular collaborative project such that one or more client computing device(s) 104 associated with one or more respective user profiles can simultaneously generate, update, and/or remove digital content associated with the collaborative project. As such, the same representation of digital content associated with a particular collaborative project can be rendered on one or more respective interactive user interfaces associated with the one or more user computing device(s) 104, and any generation, update, and/or removal of the digital content is rendered in near real time on the one or more respective interactive user interfaces. An example of a web-based collaboration platform 116 that may use and/or be developed by using the sensitive data protection techniques disclosed herein is the Trello® web-based collaboration platform that is offered by Atlassian PTY LTD.

Figure 2:
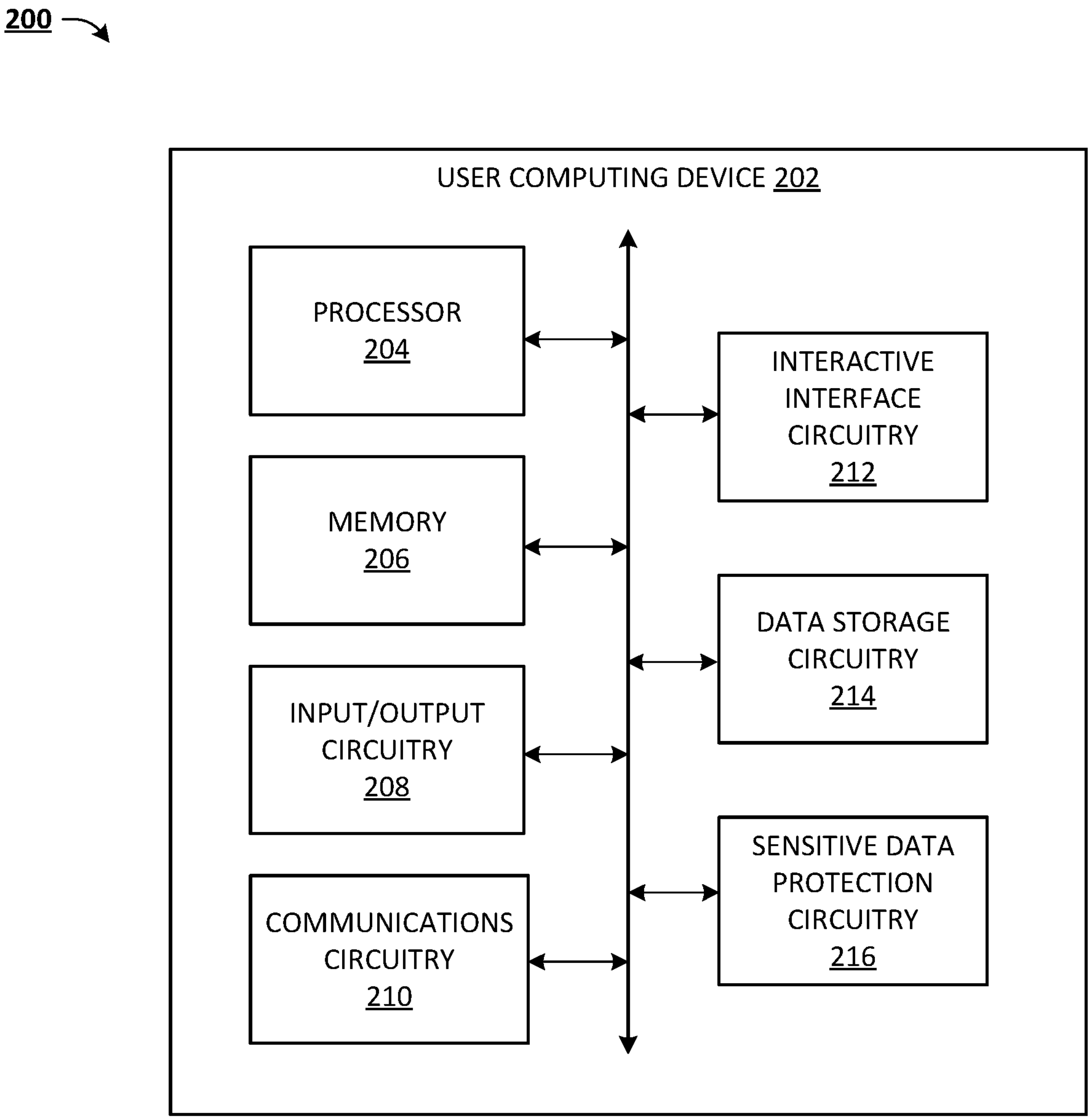
FIG. 2 is a block diagram of an exemplary user computing device structured in accordance with one or more embodiments of the present disclosure.

FIG. 2 illustrates a block diagram 200 of an example apparatus according to one or more described features of one or more embodiments of the disclosure. Specifically, the block diagram 200 includes a user computing device 202 to provide a practical application of sensitive data protection in accordance with at least some example embodiments of the present disclosure. In some embodiments, the sensitive data protection system 102 can be integrated with, or embodied by, one or more devices such as the user computing device 202 as depicted and described in FIG. 2.

The user computing device 202 includes processor 204, memory 206, input/output circuitry 208, communications circuitry 210, interactive interface circuitry 212, data storage circuitry 214, and/or sensitive data protection circuitry 216. In some embodiments, the user computing device 202 is configured, using one or more of the sets of circuitry 204, 206, 208, 210, 212, 214, and/or 216, to execute and perform the operations described herein.

In general, the terms computing device, system, entity, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the user computing device 202 embodies a particular, specially configured computing system transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the user computing device 202 provide or supplement the functionality of another particular set of circuitry. For example, the processor 204 in some embodiments provides processing functionality to any of the sets of circuitry, the memory 206 provides storage functionality to any of the sets of circuitry, the communications circuitry 210 provides network interface functionality to any of the sets of circuitry, and/or the like.

In some embodiments, the processor 204 (and/or co-processor or any other processing circuitry assisting or otherwise associated with the processor) is/are in communication with the memory 206 via a bus for passing information among components of the user computing device 202. In some embodiments, for example, the memory 206 is non-transitory and may include, for example, one or more volatile and/or non-volatile memories. In other words, for example, the memory 206 in some embodiments includes or embodies an electronic storage device (e.g., a non-transitory computer readable storage medium). In some embodiments, the memory 206 is configured to store information, data, content, applications, instructions, or the like, for enabling the user computing device 202 to carry out various functions in accordance with example embodiments of the present disclosure.

The processor 204 may be embodied in a number of different ways. For example, in some example embodiments, the processor 204 includes one or more processing devices configured to perform independently. Additionally or alternatively, in some embodiments, the processor 204 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the user computing device 202, and/or one or more remote or "cloud" processor(s) external to the user computing device 202.

In an example embodiment, the processor 204 is configured to execute instructions stored in the memory 206 or otherwise accessible to the processor. Alternatively or additionally, the processor 204 in some embodiments is configured to execute hard-coded functionality. As such, whether configured by hardware or software methods, or by a combination thereof, the processor 204 represents an entity (e.g., physically embodied in circuitry) capable of performing operations according to an embodiment of the present disclosure while configured accordingly. Alternatively or additionally, as another example in some example embodiments, when the processor 204 is embodied as an executor of software instructions, the instructions specifically configure the processor 204 to perform the algorithms embodied in the specific operations described herein when such instructions are executed.

As one particular example embodiment, the processor 204 is configured to perform various operations associated with protecting sensitive data. In some embodiments, the processor 204 includes hardware, software, firmware, and/or a combination thereof, that generates, stores, and/or maintains a secured data type 110 managed by a sensitive data protection system 102. Additionally or alternatively the processor 204 includes hardware, software, firmware, and/or a combination thereof, that casts one or more computer program portions into one or more respective intermediary alias data types and transforms the one or more respective intermediary alias data types into one or more secured data type(s) 110.

The user computing device 202 includes input/output circuitry 208 that provides output to the user and, in some embodiments, to receive an indication of a user input. In some embodiments, the input/output circuitry 208 is in communication with the processor 204 to provide such functionality. The input/output circuitry 208 may comprise one or more user interface(s) and in some embodiments includes a display that comprises the interface(s) rendered as a web user interface, an application user interface, a user device, a backend system, or the like. In some embodiments, the input/output circuitry 208 also includes a keyboard, a mouse, a joystick, a touch screen, touch areas, soft keys a microphone, a speaker, or other input/output mechanisms. The processor 204 and/or input/output circuitry 208 comprising the processor may be configured to control one or more functions of one or more user interface elements through computer program instructions (e.g., software and/or firmware) stored on a memory accessible to the processor (e.g., memory 206, and/or the like). In some embodiments, the input/output circuitry 208 includes or utilizes a user-facing application to provide input/output functionality to a user computing device and/or other display associated with a user.

The user computing device 202 also includes communications circuitry 210. The communications circuitry 210 includes any means such as a device or circuitry embodied in either hardware or a combination of hardware and software that is configured to receive and/or transmit data from/to a network (e.g., the network 112) and/or any other device, circuitry, or module in communication with the user computing device 202. In this regard, in some embodiments the communications circuitry 210 includes, for example, a network interface for enabling communications with a wired or wireless communications network (e.g., the network 112). Additionally or alternatively in some embodiments, the communications circuitry 210 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 210 includes circuitry for interacting with the antenna(s) and/or other hardware or software to cause transmission of signals via the antenna(s) or to handle receipt of signals received via the antenna(s). In some embodiments, the communications circuitry 210 enables transmission to and/or receipt of data from various components of an issue management system 101 and/or another external device in communication with the user computing device 202.

The interactive interface circuitry 212 includes hardware, software, firmware, and/or a combination thereof, that supports operation(s) facilitated in whole or in part via interaction with an interactive interface integrated with, or embodied by, a user computing device 202. In some embodiments, the interactive interface circuitry 212 includes hardware, software, firmware, and/or any combination thereof, that processes request(s) to perform operations associated with a sensitive data protection system 102. In some embodiments, interactive interface circuitry 212 includes a separate processor, specially configured field programmable gate array (FPGA), or a specially programmed application specific integrated circuit (ASIC).

The data storage circuitry 214 includes hardware, software, firmware, and/or a combination thereof, that supports functionality for generating, storing, and/or maintaining one or more portions of sensitive data 108, data related to one or more secured data type(s) 110, and/or data related to one or more intermediary alias data types managed by sensitive data protection system 102. For example, in some embodiments, the data storage circuitry 214 includes hardware, software, firmware, and/or a combination thereof, that stores one or more portions of sensitive data 108, data related to one or more secured data type(s) 110, and/or data related to one or more intermediary alias data types in a data store 106. In some embodiments, the data storage circuitry 214 can be integrated with, or embodied by, the data store 106. In some embodiments, the data storage circuitry 214 includes a separate processor, specially configured field programmable gate array (FPGA), or a specially programmed application specific integrated circuit (ASIC).

The sensitive data protection circuitry 216 includes hardware, software, firmware, and/or a combination thereof, that performs one or more sensitive data protection process(es) according to one or more embodiments described herein. For example, in some embodiments, the sensitive data protection circuitry 216 includes hardware, software, firmware, and/or a combination thereof, that can parse one or more computer program code portions to identify one or more portions of sensitive data 108. In another example, in some embodiments, the sensitive data protection circuitry 216 includes hardware, software, firmware, and/or a combination thereof, that can cast the one or more computer program code portions associated with the one or more portions of sensitive data 108 portions into one or more respective intermediary alias data types. In another example, the sensitive data protection circuitry 216 includes hardware, software, firmware, and/or a combination thereof, that can transform one or more computer program code portions that were casted into the respective intermediary alias data types into one or more respective secured data type(s) 110 such that the one or more portions of sensitive data 108 associated with the one or more respective secured data type(s) 110 are secured against unauthorized access by one or more computer applications. In some embodiments, the sensitive data protection circuitry 216 includes a separate processor, specially configured field programmable gate array (FPGA), or a specially programmed application specific integrated circuit (ASIC).

Additionally or alternatively, in some embodiments, two or more of the sets of circuitries 204-216 are combinable. Additionally or alternatively, in some embodiments, one or more of the sets of circuitry perform some or all of the functionality described associated with another component. For example, in some embodiments, two or more of the sets of circuitry 204-216 are combined into a single module embodied in hardware, software, firmware, and/or a combination thereof. Similarly, in some embodiments, one or more of the sets of circuitry, for example the interactive interface circuitry 212, data storage circuitry 214, and/or sensitive data protection circuitry 216, is/are combined with the processor 204, such that the processor 204 performs one or more of the operations described above with respect to each of these sets of circuitry 212-216.

Figure 3:
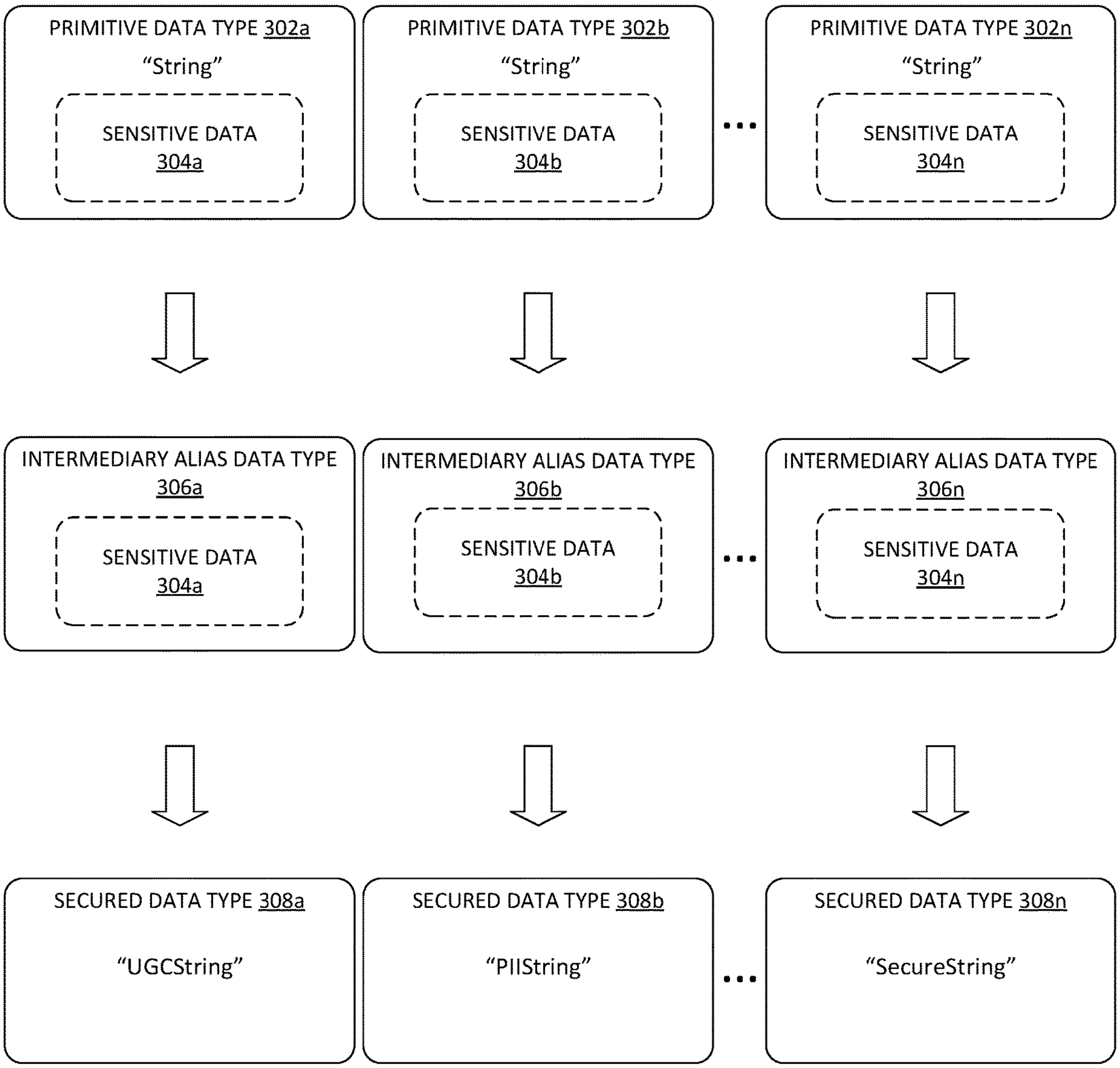
FIG. 3 is a block diagram of an exemplary transformation of sensitive data associated with a particular primitive data type into a secured data type in accordance with one or more embodiments of the present disclosure.

FIG. 3 is a block diagram of an exemplary transformation of sensitive data associated with a particular primitive data type into a secured data type in accordance with one or more embodiments of the present disclosure. Specifically, FIG. 3 illustrates the transformation of multiple portions of sensitive data 304*a-n* associated with primitive data types 302*a-n* into secured data types 308*a-n*. As described herein, the transformation of the multiple portions of sensitive data 304*a-n* associated with the primitive data types 302*a-n* can be executed by a user computing device 104 associated with the sensitive data protection system 102. In various embodiments, the primitive data types 302*a-n* associated with the multiple portions of sensitive data 304*a-n* can be generated, modified, utilized and/or otherwise associated with an IDE 114. Additionally or alternatively, the multiple portions of sensitive data 304*a-n* associated with the primitive data types 302*a-n* can be stored, managed, and/or otherwise maintained by the data store 106. Similarly, the secured data types 308*a-n* can be stored, managed, and/or otherwise maintained by the data store 106.

The sensitive data protection system 102 can classify, categorize, and/or otherwise label one or more portions of sensitive data 304*a-n* according to a particular sensitive data category. Non-limiting examples of sensitive data categories include user generated content (UGC), personally identifiable information (PII), application usage data, security data, enterprise data, and/or commerce data. The one or more portions of sensitive data 304*a-n* associated with the one or more respective sensitive data categories can be stored in the data store 106 associated with an enterprise and/or a web-based collaboration platform 116.

In various embodiments, the sensitive data categories can be derived from one or more respective database schema labels. For example, in an embodiment in which one or more portions of sensitive data 304*a-n* associated with a particular enterprise are stored in the data store 106, the one or more portions of sensitive data 304*a-n* may be labeled according to a predefined database schema employed in the data store 106. As such, one or more labels defined by the database schema utilized by the data store 106 can be used by the sensitive data protection system 102 to generate the one or more sensitive data categories. Additionally or alternatively, in various embodiments, the sensitive data protection system 102 can generate one or more secured data type(s) 308*a-n* based in part on one or more respective sensitive data categories associated with the sensitive data 304*a-n*. Furthermore, one or more secured data type(s) 308*a-n* can be associated with at least one respective primitive data type (e.g., primitive data type 302*a* characterized as a String) and/or a particular array type (e.g., a 2-D array associated with a particular primitive data type 302*a*).

FIG. 3 illustrates some non-limiting examples of secured data type(s) 308*a-n* generated by the sensitive data protection system 102 in accordance with one or more embodiments of the present disclosure. For example, secured data type 308*a* is configured as a UGCString associated with sensitive data 304*a* comprising UGC. Non-limiting examples of UGC include any data generated by a user computing device 202 via a web-based collaboration platform 116 such as digital content, free-form text, image and/or video media, labels and/or fields related to a database schema (e.g., as utilized by a data store 106), end user names, company names, organization names, API key names, custom emoji names, application and/or service keys, comment data, workflow data, project data, source code (e.g., computer programming code), application installation data, and/or permissions data.

An additional example is the secured data type 308*b* configured as a PIIString associated with sensitive data 304*b* comprising PII. Non-limiting examples of PII include any data and/or identifying information related to an end user, a user profile, a user account, an enterprise profile, a name, a home address, a business address, an e-mail address, a user profile picture, a phone number, an enterprise team name, a date of birth, an IP address (e.g., associated with a user computing device 202), a sexual preference, credit card information, and/or online session information (e.g., data related to a work session performed via a web-based collaboration platform 116).

An additional example is the secured data type 308*n* configured as a SecureString associated with sensitive data 304*n* comprising security-related data. Non-limiting examples of security-related data include passwords, hashed passwords, encrypted passwords, API tokens, authorization bearer tokens (e.g., SAML assertions), TLS certificates, OAuth tokens, commerce tokens (e.g., used to charge a customer via a third-party credit card vendor), tokens used as credentials, user context tokens, private keys, SSH keys, and/or device certificates (e.g., certificates related to the user computing device 202).

The sensitive data protection system 102 can generate the one or more secured data type(s) 308*a-n* in various ways. For example, in various embodiments, the sensitive data protection system 102 can transform one or more computer program portions into one or more respective secured data type(s) 308*a-n* by first parsing a computer programming code file that comprises the one or more computer program portions to identify one or more portions of sensitive data 304*a-n*. While parsing the computer programming code file, the sensitive data protection system 102 can cast, mark, label, flag, and/or otherwise designate one or more computer program portions, electronically managed data, data object, and/or the like that comprise, point to, and/or are otherwise associated with the one or more portions of sensitive data 304*a-n* as a respective intermediary alias data type 306*a-n*.

Furthermore, the sensitive data protection system 102 is configured to cast, convert and/or otherwise transform one or more intermediary alias data type(s) 306*a-n* into one or more respective secured data type(s) 308*a-n* in order to protect the associated portions of sensitive data 304*a-n* from one or more third-party computer applications, third-party services, third-party end users, third-party enterprises, and/or any other entity that should not have access to the portions of sensitive data 304*a-n*. In order to transform the intermediary alias data type(s) 306*a-n* into one or more secured data type(s) 308*a-n*, the sensitive data protection system 102 can perform various pre-processing operations. For example, in various embodiments, the sensitive data protection system 102 can score, rank, classify, and/or otherwise assign a predicted data sensitivity score to a respective intermediary alias data type 306*a-n*. The predicted data sensitivity score describes a level of sensitivity, importance, secrecy, significance and/or classification associated with the respective portions of sensitive data 304*a-n* associated with the intermediary alias data type(s) 306*a-n*.

In various embodiments, factors such as a corresponding sensitive data category (e.g., security-related data vs. UGC data) can impact the predicted data sensitivity score of a respective intermediary alias data type 306*a-n*. For example, the sensitive data protection system 102 may determine that a first intermediary alias data type 306*a* associated with sensitive data 304*a* related to security-related data (e.g., password data) has a higher relative predicted data sensitivity score (e.g., higher relative importance and/or sensitivity) than a second intermediary alias data type 306*b* associated with sensitive data 304*b* related to UGC (e.g., data related to digital content generated by a web-based collaboration platform 116 via user computing device 202).

Based on the predicted data sensitivity score, the sensitive data protection system 102 can determine whether to convert the intermediary alias data type(s) 306*a-n* into a respective secured data type 308*a-n*. For example, the sensitive data protection system 102 can be configured to pre-determine a predicted data sensitivity score threshold that an intermediary alias data type 306*a-n* must satisfy (e.g., meet or exceed) in order to be transformed into a secured data type 308*a-n*. If the sensitive data protection system 102 determines that a particular computer program portion that has been cast into an intermediary alias data type 306*a-n* is associated with a predicted data sensitivity score that satisfies (e.g., meets and/or exceeds) the predicted data sensitivity score threshold, the sensitive data protection system 102 can decide to convert the particular computer program portion that has been cast into an intermediary alias data type 306*a-n* into a secured data type 308*a-n*.

In some embodiments, the sensitive data protection system 102 can transform the one or more primitive data type(s) 302*a-n* associated with the one or more portions of sensitive data 304*a-n* into one or more respective secured data type(s) 308*a-n* without first converting the one or more primitive data type(s) 302*a-n* into one or more intermediary alas data type(s) 306*a-n*. As such, the sensitive data protection system 102 can bypass executing one or more operations related to converting the one or more primitive data type(s) 302*a-n* into one or more intermediary alas data type(s) 306*a-n*. For example, the sensitive data protection system 102 can bypass executing the one or more pre-processing operations related to determining a predicted data sensitivity score for each of the one or more respective intermediary alas data type(s) 306*a-n*.

As will be appreciated, the sensitive data protection system 102 can be configured to facilitate the development of various software applications (e.g., a web-based collaboration platform 116) that may generate, manage, and/or otherwise interact with sensitive data 304*a-n*. For example, the sensitive data protection system 102 is configured to generate and/or execute a custom linting rule set for performing computer program code analysis to ensure the protection and safe usage of sensitive data. In this regard, the custom linting rule set can be generated by the sensitive data protection system 102 and configured to integrate with one or more computer program code drafting applications (e.g., one or more IDE(s) 114).

The one or more custom linting rule sets can be configured to flag and/or correct one or more predefined computer program code errors, one or more unsecure computer program code constructs (e.g., unsecure data objects comprising sensitive data 304*a-n*), one or more computer programming bugs, one or more stylistic errors associated with one or more portions of computer program code, and/or one or more syntax errors associated with one or more portions of computer program code. In various embodiments, the custom linting rule set can be configured to analyze and/or correct computer program code associated with sensitive data 304*a-n* written in one or more respective computer programming languages such as, for example, JavaScript, Typescript, Python, Java, C++, C#, HTML, and/or the like.

As such, the sensitive data protection system 102 can configure the secured data type(s) 308*a-n* to make the one or more respective portions of sensitive data 304*a-n* associated with the secured data type 308*a-n* inaccessible to one or more programming functions associated with one or more programming libraries used by the one or more IDE(s) 114. Non-limiting examples of the one or more programming functions associated with the one or more programming libraries include programming functions that return a particular primitive data type (e.g., a String, Integer, Floating Decimal, and/or the like) associated with the secured data type 308*a-n*, and/or programming functions that can output, log, transmit, print, mutate (e.g., concatenate, split, format, and/or append), cast, and/or otherwise employ the sensitive data 304*a-n* associated with the secured data type 308*a-n*. A non-limiting example of such a programming function is the ".toLowerCase( )" and/or the standard equivalent programming function that can format a portion of sensitive data 304*a* associated with a particular primitive data type 302*a* characterized as a String data type by transforming any uppercase alphanumeric characters associated with the portion of sensitive data 304*a* into a respective lowercase alphanumeric character.

Programming functions such as ".toLowerCase( )" as well as other common programming functions that mutate and/or format text data (e.g., concatenation functions), often "return," log, transmit, or otherwise make available the text data that has been mutated. Additionally, a common practice is to use predefined data objects (e.g., potentially associated with portions of sensitive data 304*a-n*) in a string template configured to generate one or more passages of boilerplate text content comprising one or more specific data attributes associated with a particular instance of the predefined data object. In many circumstances this is the desired result of executing such a programming function and/or template. However, such programming functions and/or templates can be inherently risky when the data that the programming functions are mutating and/or formatting is sensitive data (e.g., sensitive data 304*a-n*). By configuring and/or employing the one or more custom linting rule sets, the sensitive data protection system 102 can ensure that safe programming practices are enforced and that sensitive data (e.g., sensitive data 304*a-n*) cannot be exposed through the usage of common programming functions.

In addition to integrating with one or more IDE(s) 114, the sensitive data protection system 102 can also integrate with a web-based collaboration platform 116. In various embodiments, the sensitive data protection system 102 and the web-based collaboration platform 116 are also integrated with the data store 106 (e.g., via the network 112). Because various third-party web applications, third-party web-based services, third-party websites, third-party software, and/or the like need to execute various data queries and/or searches in a database (e.g., data store 106) in order to perform certain tasks, it is desirable that any sensitive data (e.g., sensitive data 304*a-n*) be protected from any such third-party data queries and/or searches. As such, the secured data types 308*a-n* generated by the sensitive data protection system 102 stored in the data store 106 can be utilized by a web-based collaboration platform 116 without the risk that any of the multiple portions of sensitive data 304*a-n* will be exposed, stolen, and/or otherwise accessed by an untrusted third-party entity.

FIGS. 4A-B illustrate an exemplary application of a custom linting rule set configured for an IDE in accordance with one or more embodiments of the present disclosure. Specifically, FIGS. 4A-B depict how the employment of a custom linting rule set configured by the sensitive data protection system 102 can be used to ensure that sensitive data (e.g., sensitive data 304*a-n*) is not logged, transformed, mutated, transmitted, and/or otherwise used in a manner that may put the sensitive data at risk of exposure to one or more unauthorized third-party entities.

FIG. 4A depicts an interface data object 402 generated by an IDE 114 via a user computing device 104. As shown, the interface data object 402 can be used to create one or more instances of "Board" data objects that will have the same predefined types of properties associated with them. For example, the interface data object 402 contains, among others, a property "name" that has been typed (e.g., declared, designated, etc.) to be a secured data type (e.g., secured data type 308*a*) that is characterized as a UGCString. Generally, this means that any Board data objects generated based on the interface data object 402 will have a name property that must be of a secured data type (e.g., secured data type 308*a*), and specifically a UGCString that has been generated by the sensitive data protection system 102 by the various methods described herein. Data values associated with a respective property of a data object (e.g., an instance of Board) must match the data type associated with the respective property or the computer programming code associated with the data object will not be compiled and/or executed by the IDE 114.

FIG. 4B depicts an example code snippet 404 drafted in the IDE 114 via the user computing device 104, as well as a linting rule violation popup 406. As shown, the example code snippet 404 contains a first line of executable code written as "let model=new Board( )". This first line of executable code has been written to generate a new instance of a Board data object (e.g., based on the interface data object 402) where the variable name of the particular Board instance being generated is called "model" such that the variable name "model" can be used by one or more computer programming functions to reference that particular Board data object.

The example code snippet 404 also contains a second line of executable code written as "log (model.name)". This second line of executable code has been written to return (e.g., log, print, and/or otherwise make available) the data value associated with the "name" property of the Board data object referenced as "model." In normal circumstances, if the "name" property of the Board data object was designated as a String primitive data type, the second line of executable code in the example code snippet 404 would return the data value (e.g., one or more alphanumeric characters) associated with the "name" property. For example, if the "name" property was designated as a String data type, and the corresponding data value was "Trello_Board_1," then the second line of executable code would return (e.g., log, print, and/or otherwise make available) the data value "Trello_Board_1."

However, because the interface data object 402 has been configured such that the "name" property must be a secured data type (e.g., secured data type 308*a*), and specifically a UGCString secured data type, the second line of executable code in the example code snippet 404 (e.g., "log (model.name)") will cause an error to occur in the IDE 114. Specifically, such a programming error would violate one or more custom linting rules configured by the sensitive data protection system 102. The one or more custom linting rules are enforced to ensure that sensitive data (e.g., sensitive data 304*a*) associated with a secured data type (e.g., secured data type 308*a*) will not be logged, printed, transmitted, and/or otherwise exposed. Because the second line of executable code associated with the example code snippet 404 is violating one or more custom linting rules by attempting to return a data value associated with sensitive data related to a secured data type, the sensitive data protection system 102 generates a warning. Specifically, as shown in FIG. 4B, the sensitive data protection system 102 can generate a linting rule violation popup 406 to be rendered via the IDE 114 on an interactive user interface of a user computing device 202.

The linting rule violation popup 406 can be configured to render one or more portions of data related to custom linting rule being violated, the data object and/or computer program code involved in the linting rule violation, and/or one or more suggestions related to correcting the computer program code such that the computer program code will no longer violate the custom linting rule being enforced by the sensitive data protection system 102.

In various embodiments, the sensitive data protection system 102 can keep one or more computer program files generated by the IDE 114 from compiling and/or being executed if the one or more computer program files contain one or more custom linting rule violations. For example, the executable code associated with the one or more computer program files will not be operable until the one or more custom linting rule violations have been corrected.

In various other embodiments, the sensitive data protection system 102 can be configured to generate one or more linting rule violation popup(s) 406 via the IDE 114 in response to detecting one or more linting rule violations while still allowing the computer program files to compile and/or be executed. In this scenario, any sensitive data (e.g., sensitive data 304*a-n*) may be exposed unless the one or more linting rule violations have been corrected.

In various other embodiments, the sensitive data protection system 102 can cause a predefined redaction object (e.g., a predefined String such as "REDACTED") to be inserted in place of one or more portions of sensitive data 304*a-n*. For example, if a computer programming function attempts to return, print, log, and/or otherwise make available a data value associated with sensitive data 304*a*, the sensitive data protection system 102 can insert the predefined redaction object in place of the sensitive data 304*a*. In such an embodiment, if the second line of executable code contained in the example code snippet 404 (e.g., "log (model.name)") were to be executed, the sensitive data protection system 102 could cause the predefined redaction object (e.g., the String "REDACTED") to be returned in place of the data value associated with "model.name" which is a UGCString secured data type associated with sensitive data comprising UGC.

As will be appreciated, the various code snippets depicted in FIGS. 4A-B (e.g., the interface data object 402 and the example code snippet 404) are merely provided as examples crafted for the purposes of this description and are by no means limiting. Any person of ordinary skill in the art will understand the multitude of potential applications of the sensitive data protection system 102 and the functionalities the sensitive data protection system 102 can provide when integrated with an IDE 114 when implemented in accordance with the various methods described herein.

Example Processes of the Disclosure

Having described example systems and apparatuses, data environments, data flows, and data architectures in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Similarly, it should be appreciated that one or more of the operations of each flowchart may be combinable, replaceable, and/or otherwise altered as described herein.

FIG. 5 illustrates a flowchart representing a process 500 for dynamically protecting sensitive data by transforming computer program portions into respective secured data types in accordance with one or more embodiments of the present disclosure. In some embodiments, the process 500 is embodied by computer program code stored on a non-transitory computer-readable storage medium of a computer program product configured for execution to perform the process as depicted and described. Additionally or alternatively, in some embodiments, the process 500 is performed by one or more specially configured computing devices, such as the user computing device 202 alone or in communication with one or more other component(s), device(s), and/or system(s) (e.g., the sensitive data protection system 102). In this regard, in some such embodiments, the user computing device 202 is specially configured by computer-coded instructions (e.g., executable computer program instructions) stored thereon, for example in the memory 206 and/or another component depicted and/or described herein and/or otherwise accessible to the user computing device 202, for performing the operations as depicted and described. In some embodiments, the user computing device 202 is in communication with one or more external apparatus(es), system(s), device(s), and/or the like, to perform one or more of the operations as depicted and described. For example, the user computing device 202 in some embodiments is in communication with one or more system(s) (e.g., the sensitive data protection system 102) integrated with, or embodying, an IDE 114 and/or a web-based collaboration platform 116. For purposes of simplifying the description, the process 500 is described as performed by and from the perspective of the user computing device 202.

The process 500 begins at operation 502. At operation 502, the user computing device 202 includes means, such as the interactive interface circuitry 212, data storage circuitry 214, sensitive data protection circuitry 216, communications circuitry 210, input/output circuitry 208, memory 206, and/or processor 204, or any combination thereof, that parses one or more computer program code portions to identify one or more sensitive data portions, where the one or more sensitive data portions are associated with one or more respective sensitive data categories. For example, in various embodiments, the sensitive data protection system 102 can transform one or more computer program portions into one or more respective secured data type(s) 308*a-n* by first parsing a computer programming code file that comprises the one or more computer program portions to identify one or more portions of sensitive data 304*a-n*.

The sensitive data protection system 102 can classify, categorize, and/or otherwise label one or more portions of sensitive data 304*a-n* according to a particular sensitive data category. Non-limiting examples of sensitive data categories include user generated content (UGC), personally identifiable information (PII), application usage data, security data, enterprise data, and/or commerce data. The one or more portions of sensitive data 304*a-n* associated with the one or more respective sensitive data categories can be stored in the data store 106 associated with an enterprise and/or a web-based collaboration platform 116.

In various embodiments, the sensitive data categories can be derived from one or more respective database schema labels. For example, in an embodiment in which one or more portions of sensitive data 304*a-n* associated with a particular enterprise are stored in the data store 106, the one or more portions of sensitive data 304*a-n* may be labeled according to a predefined database schema employed in the data store 106. As such, one or more labels defined by the database schema utilized by the data store 106 can be used by the sensitive data protection system 102 to generate the one or more sensitive data categories. Additionally or alternatively, in various embodiments, the sensitive data protection system 102 can generate one or more secured data type(s) 308*a-n* based in part on one or more respective sensitive data categories associated with the sensitive data 304*a-n*. Furthermore, one or more secured data type(s) 308*a-n* can be associated with at least one respective primitive data type (e.g., primitive data type 302*a* characterized as a String) and/or a particular array type (e.g., a 2-D array associated with a particular primitive data type 302*a*).

At operation 504, the user computing device 202 includes means, such as the interactive interface circuitry 212, data storage circuitry 214, sensitive data protection circuitry 216, communications circuitry 210, input/output circuitry 208, memory 206, and/or processor 204, or any combination thereof, that transforms the one or more computer program code portions into one or more respective secured data types such that the one or more sensitive data portions associated with the one or more respective secured data types are secured against unauthorized access by one or more computer applications.

While parsing the computer programming code file (e.g., as during operation 502), the sensitive data protection system 102 can cast, mark, label, flag, and/or otherwise designate one or more computer program portions, electronically managed data, data object, and/or the like that comprise, point to, and/or are otherwise associated with the one or more portions of sensitive data 304*a-n* as a respective intermediary alias data type 306*a-n*. Furthermore, the sensitive data protection system 102 is configured to cast, convert and/or otherwise transform one or more intermediary alias data type(s) 306*a-n* into one or more respective secured data type(s) 308*a-n* in order to protect the associated portions of sensitive data 304*a-n* from one or more third-party computer applications, third-party services, third-party end users, third-party enterprises, and/or any other entity that should not have access to the portions of sensitive data 304*a-n*.

In order to transform the intermediary alias data type(s) 306*a-n* into one or more secured data type(s) 308*a-n*, the sensitive data protection system 102 can perform various pre-processing operations. For example, in various embodiments, the sensitive data protection system 102 can score, rank, classify, and/or otherwise assign a predicted data sensitivity score to a respective intermediary alias data type 306*a-n*. The predicted data sensitivity score describes a level of sensitivity, importance, secrecy, significance and/or classification associated with the respective portions of sensitive data 304*a-n* associated with the intermediary alias data type(s) 306*a-n*. Based on the predicted data sensitivity score, the sensitive data protection system 102 can determine whether to convert the intermediary alias data type(s) 306*a-n* into a respective secured data type 308*a-n*.

FIG. 6 illustrates a flowchart representing a process 600 for computing predicted data sensitivity scores in accordance with one or more embodiments of the present disclosure. In some embodiments, the process 600 is embodied by computer program code stored on a non-transitory computer-readable storage medium of a computer program product configured for execution to perform the process as depicted and described. Alternatively or additionally, in some embodiments, the process 600 is performed by one or more specially configured computing devices, such as the user computing device 202 alone or in communication with one or more other component(s), device(s), system(s) (e.g., the sensitive data protection system 102), and/or the like. In this regard, in some such embodiments, the user computing device 202 is specially configured by computer-coded instructions (e.g., executable computer program instructions) stored thereon, for example in the memory 206 and/or another component depicted and/or described herein and/or otherwise accessible to the user computing device 202, for performing the operations as depicted and described. In some embodiments, the user computing device 202 is in communication with one or more external apparatus(es), system(s), device(s), and/or the like, to perform one or more of the operations as depicted and described. For example, the user computing device 202 in some embodiments is in communication with one or more system(s) (e.g., the sensitive data protection system 102) integrated with, or embodying, an IDE 114 and/or a web-based collaboration platform 116. For purposes of simplifying the description, the process 600 is described as performed by and from the perspective of the user computing device 202.

The process 600 begins at operation 602. In some embodiments, the process 600 begins after one or more operations depicted and/or described with respect to any one of the other processes described herein. For example, in some embodiments as depicted, the process 600 begins before execution of operation 502. In this regard, some, or all, of the process 600 may replace or supplement one or more blocks depicted and/or described with respect to any of the processes described herein. Upon completion of the process 600, the flow of operations may terminate. Additionally or alternatively, as depicted, upon completion of the process 600 in some embodiments, flow may return to one or more operation(s) of another process, such as the operation 502. It will be appreciated that, in some embodiments, the process 600 embodies a sub-process of one or more other process(es) depicted and/or described herein, for example the process 500.

At operation 602 the user computing device 202 includes means, such as the interactive interface circuitry 212, data storage circuitry 214, sensitive data protection circuitry 216, communications circuitry 210, input/output circuitry 208, memory 206, and/or processor 204, or any combination thereof, that ranks, based on a predicted data sensitivity score, each of the one or more computer program code portions that were cast into the intermediary alias data type.

For example, in order to transform the intermediary alias data type(s) 306*a-n* into one or more secured data type(s) 308*a-n*, the sensitive data protection system 102 can perform various pre-processing operations. For example, in various embodiments, the sensitive data protection system 102 can score, rank, classify, and/or otherwise assign a predicted data sensitivity score to a respective intermediary alias data type 306*a-n*. The predicted data sensitivity score describes a level of sensitivity, importance, secrecy, significance and/or classification associated with the respective portions of sensitive data 304*a-n* associated with the intermediary alias data type(s) 306*a-n*.

In various embodiments, factors such as a corresponding sensitive data category (e.g., security-related data vs. UGC data) can impact the predicted data sensitivity score of a respective intermediary alias data type 306*a-n*. For example, the sensitive data protection system 102 may determine that a first intermediary alias data type 306*a* associated with sensitive data 304*a* related to security-related data (e.g., password data) has a higher relative predicted data sensitivity score (e.g., higher relative importance and/or sensitivity) than a second intermediary alias data type 306*b* associated with sensitive data 304*b* related to UGC (e.g., data related to digital content generated by a web-based collaboration platform 116 via user computing device 202).

At operation 604 the user computing device 202 includes means, such as the interactive interface circuitry 212, data storage circuitry 214, sensitive data protection circuitry 216, communications circuitry 210, input/output circuitry 208, memory 206, and/or processor 204, or any combination thereof, that determines, based the respective predicted data sensitivity scores, whether the one or more computer program code portions that were cast into the intermediary alias data type satisfy a predicted data sensitivity score threshold. For example, the sensitive data protection system 102 can be configured to pre-determine a predicted data sensitivity score threshold that an intermediary alias data type 306*a-n* must satisfy (e.g., meet or exceed) in order to be transformed into a secured data type 308*a-n*.

Continuing the example provided above with reference to operation 602, the sensitive data protection system 102 may determine that the predicted data sensitivity score associated with the first intermediary alias data type 306*a* associated with the sensitive data 304*a* related to the security-related data (e.g., password data) satisfies the predicted data sensitivity score threshold. In contrast, the sensitive data protection system 102 may determine that the predicted data sensitivity score associated with the second intermediary alias data type 306*b* associated with sensitive data 304*b* related to UGC does not satisfy the predicted data sensitivity score threshold.

At operation 606 the user computing device 202 includes means, such as the interactive interface circuitry 212, data storage circuitry 214, sensitive data protection circuitry 216, communications circuitry 210, input/output circuitry 208, memory 206, and/or processor 204, or any combination thereof, that, in response to determining that the one or more computer program code portions satisfy the predicted data sensitivity score threshold, transforms the one or more computer program code portions into the one or more respective secured data types. For example, if the sensitive data protection system 102 determines that a particular computer program portion that has been cast into an intermediary alias data type 306*a-n* is associated with a predicted data sensitivity score that satisfies (e.g., meets and/or exceeds) the predicted data sensitivity score threshold, the sensitive data protection system 102 can decide to convert the particular computer program portion that has been cast into an intermediary alias data type 306*a-n* into a secured data type 308*a-n*.

Continuing the example provided above with reference to operations 602-604, because the sensitive data protection system 102 determined that the predicted data sensitivity score associated with the first intermediary alias data type 306*a* associated with the sensitive data 304*a* related to the security-related data (e.g., password data) satisfied the predicted data sensitivity score threshold, the sensitive data protection system 102 can proceed to transform the first intermediary alias data type 306*a* into a secured data type 308*a* (e.g., a SecureString secured data type). In contrast, because the sensitive data protection system 102 determined that the predicted data sensitivity score associated with the second intermediary alias data type 306*b* associated with sensitive data 304*b* related to UGC does not satisfy the predicted data sensitivity score threshold, the sensitive data protection system 102 can determine not to transform the second intermediary alias data type 306*b* associated with sensitive data 304*b* related to UGC into a secured data type 308*a-n*.

In various embodiments, the sensitive data protection system 102 can be configured to transform all computer program portions that have been cast into an intermediary alias data type 306*a-n* into a respective secured data type 308*a-n*. For example, the sensitive data protection system 102 can be configured to transform all intermediary alias data types 306*a-n* into a respective secured data type 308*a-n* regardless of a respective predicted data sensitivity score associated with the intermediary alias data types 306*a-n*. Additionally or alternatively, the sensitive data protection system 102 can be configured to bypass one or more of the pre-processing operations related to the scoring, ranking, and/or classification of the one or more intermediary alias data types 306*a-n*. For example, the sensitive data protection system 102 can be configured not to determine a predicted data sensitivity score for one or more intermediary alias data types 306*a-n* and to proceed automatically to transform any computer program code portions typed (e.g., flagged, marked, and/or the like) as an intermediary alias data type 306*a-n* into a respective secured data type 308*a-n*.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method, the computer-implemented method comprising:

parsing one or more computer program code portions to identify one or more sensitive data portions, wherein the one or more sensitive data portions are portions of data that are (i) associated with one or more respective sensitive data categories, and (ii) used in one or more programming functions that perform one or more operations with respect to data related to the one or more respective sensitive data categories; and transforming the one or more computer program code portions into one or more respective secured data types by programmatically executing at least one of a redaction function or a custom linting rule set configured to integrate with one or more integrated development environments (IDEs), wherein the one or more respective secured data types are configured to make the one or more sensitive data portions inaccessible to the one or more programming functions.

2. The computer-implemented method of claim 1, wherein parsing the one or more computer program code portions to identify the one or more sensitive data portions further comprises:

casting the one or more computer program code portions associated with the one or more sensitive data portions into an intermediary alias data type.

3. The computer-implemented method of claim 2, wherein transforming the one or more computer program code portions into the one or more respective secured data types further comprises:

ranking, based on a predicted data sensitivity score, each of the one or more computer program code portions that were cast into the intermediary alias data type; and determining, based the predicted data sensitivity score, whether the one or more computer program code portions that were cast into the intermediary alias data type satisfy a predicted data sensitivity score threshold; and in response to determining that the one or more computer program code portions satisfy the predicted data sensitivity score threshold:

transforming, the one or more computer program code portions into the one or more respective secured data types.

4. The computer-implemented method of claim 1, wherein the one or more sensitive data portions are used in one or more computer program functions that perform at least one of outputting data related to the one or more sensitive data portions, logging data related to the one or more sensitive data portions, mutating data related to the one or more sensitive data portions, or compiling metrics associated with the one or more sensitive data portions.

5. The computer-implemented method of claim 1, wherein the one or more respective sensitive data categories comprise at least one of user generated content (UGC), personally identifiable information (PII), application usage related data, security related data, enterprise related data, or commerce related data.

6. The computer-implemented method of claim 1, wherein the one or more respective secured data types are associated with at least one of one or more respective primitive data types or array types.

7. The computer-implemented method of claim 1, wherein the custom linting rule set is configured to flag one or more computer program code errors associated with the one or more sensitive data portions.

8. The computer-implemented method of claim 1, wherein the one or more respective secured data types are configured to make the one or more sensitive data portions inaccessible to one or more programming functions associated with one or more programming libraries.

9. An apparatus, the apparatus comprising:

at least one processor; and at least one memory storing instructions that, when executed by the at least one processor, cause the apparatus to:

parse one or more computer program code portions to identify one or more sensitive data portions, wherein the one or more sensitive data portions are portions of data that are (i) associated with one or more respective sensitive data categories, and (ii) used in one or more programming functions that perform one or more operations with respect to data related to the one or more respective sensitive data categories; and transform the one or more computer program code portions into one or more respective secured data types by programmatically executing at least one of a redaction function or a custom linting rule set configured to integrate with one or more integrated development environments (IDEs), wherein the one or more respective secured data types are configured to make the one or more sensitive data portions inaccessible to the one or more programming functions.

10. The apparatus of claim 9, wherein the instructions to parse the one or more computer program code portions to identify the one or more sensitive data portions further comprise instructions that cause the apparatus to:

cast the one or more computer program code portions associated with the one or more sensitive data portions into an intermediary alias data type.

11. The apparatus of claim 10, wherein the instructions to transform the one or more computer program code portions into the one or more respective secured data types further comprise instructions that cause the apparatus to:

rank, based on a predicted data sensitivity score, each of the one or more computer program code portions that were cast into the intermediary alias data type; and determine, based the predicted data sensitivity score, whether the one or more computer program code portions that were cast into the intermediary alias data type satisfy a predicted data sensitivity score threshold; and in response to determining that the one or more computer program code portions satisfy the predicted data sensitivity score threshold:

transform, the one or more computer program code portions into the one or more respective secured data types.

12. The apparatus of claim 9, wherein the one or more sensitive data portions are used in one or more computer program functions that perform at least one of outputting data related to the one or more sensitive data portions, logging data related to the one or more sensitive data portions, mutating data related to the one or more sensitive data portions, or compiling metrics associated with the one or more sensitive data portions.

13. The apparatus of claim 9, wherein the one or more respective sensitive data categories comprise at least one of user generated content (UGC), personally identifiable information (PII), application usage related data, security related data, enterprise related data, or commerce related data.

14. The apparatus of claim 9, wherein the one or more respective secured data types are associated with at least one of one or more respective primitive data types or array types.

15. The apparatus of claim 9, wherein the custom linting rule set is configured to flag one or more computer program code errors associated with the one or more sensitive data portions.

16. The apparatus of claim 9, wherein the one or more respective secured data types are configured to make the one or more sensitive data portions inaccessible to one or more programming functions associated with one or more programming libraries.

17. A non-transitory computer-readable storage medium, the non-transitory computer-readable storage medium including instructions that when executed by at least one processor cause the at least one processor to:

parse one or more computer program code portions to identify one or more sensitive data portions, wherein the one or more sensitive data portions are portions of data that are (i) associated with one or more respective sensitive data categories, and (ii) used in one or more programming functions that perform one or more operations with respect to data related to the one or more respective sensitive data categories; and transform the one or more computer program code portions into one or more respective secured data types by programmatically executing at least one of a redaction function or a custom linting rule set configured to integrate with one or more integrated development environments (IDEs), wherein the one or more respective secured data types are configured to make the one or more sensitive data portions inaccessible to the one or more programming functions.

18. The non-transitory computer-readable storage medium of claim 17, wherein the instructions to parse the one or more computer program code portions to identify the one or more sensitive data portions further comprise instructions that cause the at least one processor to:

cast the one or more computer program code portions associated with the one or more sensitive data portions into an intermediary alias data type.

19. The non-transitory computer-readable storage medium of claim 18, wherein the instructions to transform the one or more computer program code portions into the one or more respective secured data types further comprise instructions that cause the at least one processor to:

rank, based on a predicted data sensitivity score, each of the one or more computer program code portions that were cast into the intermediary alias data type; and determine, based the predicted data sensitivity score, whether the one or more computer program code portions that were cast into the intermediary alias data type satisfy a predicted data sensitivity score threshold; and in response to determining that the one or more computer program code portions satisfy the predicted data sensitivity score threshold:

transform, the one or more computer program code portions into the one or more respective secured data types.

20. The non-transitory computer-readable storage medium of claim 17, wherein the one or more sensitive data portions are used in one or more computer program functions that perform at least one of outputting data related to the one or more sensitive data portions, logging data related to the one or more sensitive data portions, mutating data related to the one or more sensitive data portions, or compiling metrics associated with the one or more sensitive data portions.

* * * * *